United States Patent
Mazzone et al.

(10) Patent No.: US 12,472,254 B2
(45) Date of Patent: Nov. 18, 2025

(54) CD8+ T-CELLS LACKING PLEXINS AND THEIR APPLICATION IN CANCER TREATMENT

(71) Applicants: VIB VZW, Ghent (BE); KATHOLIEKE UNIVERSITEIT LEUVEN, K.U.LEUVEN R&D, Leuven (BE)

(72) Inventors: Massimiliano Mazzone, Kessel-Lo (BE); Ana Oliveira, Leuven (BE); Ward Celus, Kinrooi (BE)

(73) Assignees: VIB VZW, Ghent (BE); Katholieke Universiteit Leuven, K.U. Leuven R&D, Leuven (BE)

( * ) Notice: Subject to any disclaimer, the term of this patent is extended or adjusted under 35 U.S.C. 154(b) by 958 days.

(21) Appl. No.: 17/614,421

(22) PCT Filed: May 28, 2020

(86) PCT No.: PCT/EP2020/064884
§ 371 (c)(1),
(2) Date: Nov. 26, 2021

(87) PCT Pub. No.: WO2020/239934
PCT Pub. Date: Dec. 3, 2020

(65) Prior Publication Data
US 2022/0228116 A1    Jul. 21, 2022

(30) Foreign Application Priority Data
May 28, 2019   (EP) .................................... 19176939

(51) Int. Cl.
*A61K 45/06*   (2006.01)
*A61K 40/11*   (2025.01)
(Continued)

(52) U.S. Cl.
CPC .............. *A61K 45/06* (2013.01); *A61K 40/11* (2025.01); *A61K 40/42* (2025.01);
(Continued)

(58) Field of Classification Search
CPC ........ A61K 45/06; A61K 40/11; A61K 40/42; A61K 40/4202; A61K 2239/31;
(Continued)

(56) References Cited

FOREIGN PATENT DOCUMENTS

WO    2011066284 A1    6/2011
WO    WO-2015037009 A1 *  3/2015    ............. C07K 16/28

OTHER PUBLICATIONS

Topham (Topham, David J., and Emma C. Reilly. "Tissue-resident memory CD8+ T cells: from phenotype to function." Frontiers in immunology 9 (2018): 515.) (Year: 2018).*
Wen supplemental figures (Year: 2010).*
(Continued)

*Primary Examiner* — Tracy Vivlemore
*Assistant Examiner* — Thomas R. Amick
(74) *Attorney, Agent, or Firm* — Patent Law Works LLP

(57) ABSTRACT

The invention relates to field of cancer therapy. In particular, it relates to (populations of) isolated CD8+ T-cells substantially lacking functional plexin-A2 and/or plexin-A4. Such cells can be employed in e.g. adoptive cell transfer to treat a tumor or cancer.

19 Claims, 15 Drawing Sheets

Specification includes a Sequence Listing.

(51) Int. Cl.
  *A61K 40/42* (2025.01)
  *A61P 35/00* (2006.01)
  *C12N 5/0783* (2010.01)
(52) U.S. Cl.
  CPC .......... *A61K 40/4202* (2025.01); *A61P 35/00* (2018.01); *C12N 5/0638* (2013.01); *A61K 2239/31* (2023.05); *A61K 2239/38* (2023.05); *A61K 2239/57* (2023.05); *C12N 2510/00* (2013.01)
(58) Field of Classification Search
  CPC . A61K 2239/38; A61K 2239/57; A61P 35/00; C12N 5/0638; C12N 2510/00; C12N 2310/14; C12N 2310/16
  See application file for complete search history.

(56) References Cited

OTHER PUBLICATIONS

Ito, Daisuke, et al., "mTOR Complex Signaling through the SEMA4A-Plexin B2 Axis Is Required for Optimal Activation and Differentiation of CD8+ T Cells." The Journal of mmunology, Aug. 1, 2015, vol. 195, No. 3; pp. 934-943.

Kikutani, Hitoshi, et al., "Semaphorins in interactions between T cells and antigen-presenting cells." Nature Reviews Immunology, Nature Pub. Group, vol. 3, No. 2,, Feb. 1, 2003; pp. 159-167.

PCT International Search Report and Written Opinion; Application No. PCT/EP2020/064884 VIB VZW, international filing date of May 28, 2020, search report date of mailing Jul. 29, 2020, 10 pages.

Perala, Nina, et al., "More than nervous: The emerging roles of plexins." Differentiation, vol. 83, Issue 1, Jan. 2012, pp. 77-91.

Wen, H. et al., "Plexin-A4-semaphorin 3A signaling is required for Toll-like receptor- and sepsis-induced cytokine storm." The Journal of Experimental Medicine, The Rockefeller University Press, Dec. 20, 2010, vol. 207, No. 13 pp. 2943-2957.

Worzfeld, Thomas, et al., "Semaphorins and plexins as therapeutic targets." Nature Reviews Drug Discovery, vol. 13, No. 8, Aug. 1, 2014, pp. 603-621.

Yamamoto, Midori et al., "Plexin-A4 negatively regulates T lymphocyte responses." International Immunology, vol. 20, Issue 3, Mar. 2008, pp. 413-420, https://doi.org/10.1093/intimm/dxn006.

* cited by examiner

CD8+ T-CELLS LACKING PLEXINS AND THEIR APPLICATION IN CANCER TREATMENT

CROSS REFERENCE TO RELATED APPLICATIONS

This application is a national phase entry under 35 U.S.C. § 371 of International Patent Application PCT/EP2020/064884, filed May 28, 2020, designating the United States of America and published in English as International Patent Publication WO 2020/239934 on Dec. 3, 2020, which claims the benefit under Article 8 of the Patent Cooperation Treaty to European Patent Application Serial No. 19176939.7, filed May 28, 2019, the entireties of which are hereby incorporated by reference.

FIELD OF THE INVENTION

The invention relates to field of cancer therapy. In particular, it relates to (populations of) isolated CD8+ T-cells substantially lacking functional plexin-A2 and/or plexin-A4. Such cells can be employed in e.g. adoptive cell transfer to treat a tumor or cancer.

BACKGROUND OF THE INVENTION

After years of evidence that even the best cytotoxic regimens were unsuccessful in curing late stage malignancies, immunotherapy emerged as a promising treatment for cancer patients (for a review, see e.g. Decker et al. 2017, Front Immunol 8:829). These offer a rapid and robust activity (e.g., anti-PD-1 treatment in melanoma (Hamid et al. 2013, N Engl J Med 369:134-144), mostly because, once the immune system is activated, it can potentiate a self-propagating and adaptable response (Chen & Mellman 2013, Immunity 39:1-10). Indeed, immunotherapy leads to durable clinical responses, but only in a fraction of patients and tumor types (Sharma & Allison 2015, Science 348:56-61). The so-called immunologically "cold" tumors are characterized by an enrichment in immunosuppressive cytokines, high number of regulatory T (Treg) cells, and few T helper 1 ($T_H1$), natural killer (NK), cytotoxic (CD8$^+$) T lymphocytes (CTLs) and antigen-presenting cells (APCs) (Nagarsheth et al. 2017, Nat Rev Immunol 17:559-572). In these tumors, the immunosuppressive tumor microenvironment (TME) can hamper the efficiency of immunotherapy independently from their antigenicity (Joyce & Fearon 2015, Science 348:74-80; Hugo et al. 2016, Cell 165:35-44; Spranger et al. 2016, PNAS 113:E7759-E7768). Thus, a deeper understanding of the mechanisms defining the immune landscape of a tumor could attain a broader and more durable response to this therapeutic option.

Plexins are large transmembrane glycoproteins that function as the receptors/ligands for the axon guidance proteins named semaphorins (Perala et al. 2012, Differentiation 83:77-91; Battistini & Tamagnone 2016, Cell Mol Life Sci 73:1609-1622. Accordingly, for several years, the research on this topic was focused on the nervous system, where they play a bifunctional role, having the capacity to exert both repulsive and attractive effects (He et al. 2002, Sci STKE 2002(119):re1). These chemoattractant properties together with the discovery of their role in immune responses in both physiological and pathological conditions (Kumanogoh & Kikutani 2013, Nat Rev Immunol 13:802-814; Roney et al. 2013, Protein Cell 4:17-26) led to the study of semaphorin signaling in the TME (Capparuccia et al. 2009, J Cell Sci 122:1723-1736). It was already demonstrated that blocking of Sema3A signaling plays a key role in restoring anti-tumor immunity by impeding tumor associated macrophages (TAMs) to enter hypoxic niches (Casazza et al. 2013, Cancer Cell 24:695-709). Additionally, it was shown that Sema4A signaling promotes Treg cell stability in the TME (Delgoffe et al. 2013, Nature 501:252-256). Plexin A4 (PlxnA4) is a member of class A plexins (Fujisawa 2004, J Neurobiol 59:24-33) that acts as the interactor of class 6 semaphorins (Battistini et al. 2013, Cell Mol Life Sci 73:1609-1622). Together with neuropilin 1 (Nrp1), it can also function as a co-receptor for class 3 semaphorins (Fujisawa et al. 2004, J Neurobiol 59:24-33). In the central nervous system, PlxnA4 was found to be a potent mediator of axon-repulsive activities by the direct binding to class 6 transmembrane semaphorins, Sema6A and Sema6B (Suto et al. 2005, J Neurosci 25:3628-3637; Tawarayama et al. 2010, J Neurosci 30:7049-7060). Nevertheless, in the immune system, it has different functions. On one hand, PlxnA4 seems to have a positive role in Toll-like receptor (TLR)-mediated signaling and macrophage cytokine production, as Plxna4-deficient mice have attenuated TLR-mediated inflammation, including septic shock (Wen et al. 2010, J Exp Med 207:2943-2957). On the other hand, the same mice showed enhanced T cell priming and exacerbated disease in a mouse model of experimental autoimmune encephalomyelitis (EAE) (Yamamoto et al. 2008, Int Immunol 20:413-420).

International Patent Publications WO 2001/014420, WO 2012/114339 and WO 2015/037009 are related to Plexin-A4. WO 2001/014420 discloses plexin-A4 as novel member of the plexin family; WO 2012/114339 focuses on molecules binding to type A plexins and inhibiting proliferative signals trough the type A plexin receptor without interfering with binding of the type A plexin to neuropilin or semaphorin 6A. WO 2015/037009 discloses antibodies binding to Plexin-A4.

The role of Plexin A2 (PlxnA2) in the immune system is unknown. The ligands of PlxnA2 appear to overlap with those of PlxnA4, and PlxnA2 was described as a repulsive guidance molecule in the central nervous system (Suto et al. 2007, Neuron 53:535-547; Shim et al. 2012, Mol Cell Neurosci 50:193-200).

SUMMARY OF THE INVENTION

The invention in one aspect relates to isolated CD8-positive (CD8+) T-cells characterized by (substantially) lacking functional plexin A2 and/or functional plexin-A4. The (substantial) lack of functional plexin-A2 and/or of functional plexin-A4 in these isolated CD8+ T-cells is in particular obtained ex-vivo. In particular, the (substantial) lack of functional plexin-A2 and/or of functional plexin-A4 in these isolated CD8+ T-cells is obtained as by genetic modification, by pharmacological inhibition, or by pharmacologic knock-down.

Pharmacological inhibition of plexin-A2 and/or plexin-A4 in the CD8+ T-cells is for instance by means of an agent inhibiting plexin-A2 and/or plexin-A4, whereas pharmacological knock-down is for instance obtained by means of an agent inducing degradation of plexin-A2 and/or plexin-A4. The agent inhibiting plexin-A2 and/or plexin-A4 can be an agent specifically binding to plexin-A2 and/or plexin-A4; in particular such agent is a polypeptide, a polypeptidic agent, an aptamer, or a combination of any of the foregoing.

Genetic modification of CD8+ T-cells to cause them to (substantially) lack functional plexin-A2 and/or of functional plexin-A4 is for instance by means of genetic knockout, genetic mutation or genetic silencing of the plexin-A2 and/or plexin-A4 encoding gene; in particularly it can be by means of homologous recombination, by means of RNA interference, or by means of a nuclease. An alternative genetic modification is the introduction of a genetic construct capable of driving expression of an agent inhibiting plexin-A2 and/or plexin-A4.

In any of the above, the isolated CD8+ T-cell (substantially) lacking functional plexin-A2 and/or functional plexin-A4 may be obtained from precursor CD8+ T-cells obtained from a subject having a tumor or cancer.

In any of the above, the isolated CD8+ T-cell (substantially) lacking functional plexin-A2 and/or functional plexin-A4 can be further engineered to express an antitumor T-cell receptor or a chimeric antigen receptor.

The invention in a further aspect relates to populations of CD8+ T-cells obtained by ex-vivo expansion of any of the above isolated CD8+ T-cells according to the invention.

The invention also relates to pharmaceutical compositions comprising any of the above isolated CD8+ T-cell according to the invention, or comprising any population of CD8+ T-cells according to the invention. Such pharmaceutical compositions may further comprise an anticancer agent.

In yet another aspect, any of the isolated CD8+ T-cells according to the invention or the populations of CD8+ T-cells according to the invention, or the pharmaceutical compositions according to the invention are suitable for use as medicament, for use in adoptive cell therapy, or for use in treating, inhibiting, or suppressing a tumor or cancer. This as stand-alone use or in further combination with surgery, radiation, chemotherapy, targeted therapy, immunotherapy, or a further anticancer agent.

The invention in another aspect relates to methods of producing any of the isolated CD8+ T-cells according to the invention comprising the steps of obtaining CD8+ T-cells from a subject, and ex-vivo manipulation to cause the CD8+ T-cells to lack functional plexin-A2 and/or functional plexin-A4 by means of genetic modification or pharmacological inhibition.

The invention further relates to methods of producing any population of CD8+ T-cells as described hereinabove comprising the steps of obtaining CD8+ T-cells from a subject, ex-vivo manipulation to cause the CD8+ T-cells to lack functional plexin-A2 and/or functional plexin-A4 by means of genetic modification, and ex-vivo expansion of the genetically modified CD8+ T-cells. Alternative such methods include methods comprising the steps of obtaining CD8+ T-cells from a subject, ex-vivo expansion of the CD8+ T-cells, and ex-vivo manipulation to cause the CD8+ T-cells to lack functional plexin-A2 and/or functional plexin-A4 by means of pharmacological inhibition.

In any of the above production methods, the unmodified precursor CD8+ T-cells are of autologous or of allogenic origin.

In a final aspect, the invention envisages pharmaceutical kits comprising as one component at least one of (i) any of the isolated CD8+ T-cells according to the invention, (ii) any of the populations of CD8+ T-cells according to the invention, or (iii) any of the pharmaceutical compositions according to the invention. Such pharmaceutical kits can optionally further comprise one or more anticancer agents.

DESCRIPTION OF THE FIGURES

(FIGS. 2A-2B) Subcutaneous LLC tumor growth (FIG. 2A) and weight (FIG. 2B) in mice with a full deletion of Plxna4 (KO in short) and control littermates (WT in short); (FIGS. 2C-2D) Subcutaneous B16-F10 tumor growth (FIG. 2C) and weight (FIG. 2D) in mice Plxna4 KO and control littermates; (FIG. 2E) F4/80 quantification showing TAMs infiltration of end-stage subcutaneous LLC tumors in WT and KO Plxna4 mice; (FIG. 2F) Expression of M1 (Il-12, Cxcl10, Tnfα, Cd80) and M2 (Ccl17, Il-10, Mrc1, Cxcl2) markers in TAMs sorted from subcutaneous LLC tumors growing in WT and KO Plxna4 mice; (FIGS. 2G-2I) Histological analysis (FIGS. 2G-2H) and micrographs (FIG. 2I) of LLC tumor sections stained for F4/80 and pimonidazole (PIMO), showing tumor hypoxia (FIG. 2G) and TAMs infiltration of hypoxic tumor regions (FIG. 2H) in WT and KO Plxna4 mice. (FIGS. 2J-2M) Histological quantifications of tumor vessels on thin sections of LLC tumors growing in WT and Plxna4 KO mice showing vessel density (FIG. 2J and FIG. 2L), percentage of lectin-FITC$^+$ perfused vessels over total number of CD34$^+$ vessels (FIG. 2K), and percentage of NG2$^+$ pericyte-covered vessels over the total number of CD31$^+$ vessels (FIG. 2M). n=4-5 (FIGS. 2A, 2C-2E, 2G-2M) and n=8 (FIG. 2B, two independent experiments pooled). $p<0.01$, and **$p<0.0001$ versus WT. ns, not-significant versus WT. Scale bars: 100 μm. All graphs show mean±SEM.

(FIGS. 3A-3B) Orthotopic E0771 breast cancer model tumor growth (FIG. 3A) and weight (FIG. 3B) in lethally irradiated WT mice reconstituted with WT (WT→WT) or Plxna4 KO (KO→WT) bone marrow cells; (FIG. 3C) FACS analysis of CD8$^+$ and CD4$^+$ T cell subsets infiltrating E0771 tumors 17 days after injection in WT→WT and Plxna4 KO→WT mice (n=4-6) CD4+ T cell subsets: total T helper, regulatoryT (expressing FoxP3), Th2 (expressing GATA3) and Th1 (expressing Tbet) cells. n=5-6. Dashed lines represent FMO controls. MFI, Median Fluorescent Intensity; FMO, Fluorescence Minus One. (FIGS. 3D-3E) Orthotopic GL261 glioma model tumor volume (FIG. 3D) 23 days after stereotactic injection and BLI-assessed relative tumor size (FIG. 3E) at day 15 after injection in WT→WT and Plxna4 KO→WT mice; (FIG. 3F) Quantification of CD8+-stained GL261 tumor sections from WT→WT and KO→WT mice (n=7-11). (FIG. 3G) LLC model tumor growth and weight (FIG. 3H) in lethally irradiated WT mice reconstituted with WT (WT→WT) or Plxna4 KO (KO→WT) bone marrow cells. *$p<0.05$ and **$p<0.01$ versus WT→WT. Scale bars: 50 m. All graphs show mean±SEM.

(FIG. 4A) Plxna4 expression in CD8+ T-cells sorted from subcutaneous LLC tumor-bearing WT mice. (FIG. 4B) Plxna4 expression in sorted CD8+ T-cells before and after ex-vivo activation with CD3/CD28 dyna-beads for 4 days; (FIG. 4C) Migration of WT and Plxna4-KO CD8+ T-cells towards CCL21 and CCL19; (FIGS. 4D-4F) Homing of WT and Plxna4 KO CD8+ T-cells to the lymph nodes assessed by FACS (FIG. 4D), quantification by histology (FIG. 4E) and a representative micrograph (FIG. 4F); (FIGS. 4G-4H) FACS analysis of CD8+ T-cells in the draining LNs of WT and Plxna4 KO mice bearing subcutaneous LLC tumors (FIG. 4G), or in chimeric WT→WT and Plxna4 KO→WT mice bearing orthotopic E0771 tumors (FIG. 4H); (FIG. 4I) Migration of WT and Plxna4-KO CD8+ T-cells towards CXCL9 and CXCL10. For the in vivo experiments, n=4 (FIG. 4A) and n=5-6 (FIGS. 4D-4H). (FIG. 4J) Homing of naïve WT and Plxna4 KO CD8+ T cells to the lymph nodes of WT mice treated with vehicle or FTY720 (fingolimod). (FIGS. 4K-4L) Tumor homing of activated WT and Plxna4 KO OT-I T cells to LLC-OVA tumor-bearing mice (FIG. 4J) or B16-F10-OVA tumor-bearing mice (FIG. 4K) assessed by flow cytometry 24 hours (FIGS. 4J-4K) and 48 hours (FIG. 4K) after T cell injection. In vitro results (FIGS. 4B-4C, 4I) are representative of at least two independent experiments. *p<0.05, p<0.01, *p<0.001 and ****p<0.0001 versus LNs (FIG. 4A), naïve CD8+ T-cells (FIG. 4B), WT (FIGS. 4C-4G), WT→WT control (FIG. 4H), or WT OT-I T-cells (FIG. 4K and FIG. 4L). Scale bar: 100 µm. All graphs show mean±SEM.

(FIGS. 5A-5C) Ex-vivo proliferation of WT and PlxnA4 KO Violet Cell Tracer-labelled splenocytes upon CD3/CD28 activation showing percentage of CD8+ T-cells (FIG. 5A), proliferation index (FIG. 5B) and a representative histogram of Violet Cell Tracer fluorescence intensity, gated on $CD8^+$ cells, after 4 days in culture (FIG. 5C). (FIG. 5D) Cytotoxicity marker FACS analysis of splenocytes derived CD8+ T-cells upon CD3/CD28 activation showing IFNγ and GrzmB expression in WT and Plxna4 KO $CD8^+$ T cells, after 4 days in culture. Representative of at least two independent experiments. (FIGS. 5E-5F) FACS analysis of CD69 activation marker in the draining LNs of WT and Plxna4 KO subcutaneous LLC tumor-bearing mice (FIG. 5E) or in chimeric WT→WT and Plxna4 KO→WT mice bearing orthotopic E0771 tumors (FIG. 5F); For the in vivo experiments, n=5-6 (FIGS. 5D-5F). In vitro results (FIGS. 5A-5C) are representative of at least two independent experiments. *p<0.05, p<0.01 and **p<0.0001 versus WT (FIGS. 5A-5D) or WT→WT control (FIG. 5E). #p<0.0001 versus PBS control (FIG. 5F). (FIG. 5G) FACS analysis of B16-F10-OVA tumors 24 hours after intratumoral injection of WT and Plxna4 KO OT-I T cells. All graphs show mean±SEM. Dashed lines represent FMO controls. MFI, Median Fluorescent Intensity; FMO, Fluorescence Minus One; ns, not-significant versus WT control.

(FIG. 6A) Tumor growth model in subcutaneous LLC-OVA tumor bearing mice, with ACT at day 5 (FIG. 6A) after tumor inoculation. (FIG. 6B) Tumor growth model in subcutaneous B16-F10-OVA tumor bearing mice, with ACT at day 13 (FIG. 6B) after tumor inoculation. (FIGS. 6A-6B) Comparison of WT and KO OT-I $CD8^+$ T cells and PBS as control. (FIG. 6C) Survival effect (Kaplan-Meier overall survival curves) of ATC with WT and KO OT-I $CD8^+$ T cells in subcutaneous B16-F10-OVA tumor bearing mice.

(FIG. 6D) weight and (FIG. 6E) representative images of end-stage B16-F10-OVA tumor tumors; (FIG. 6E):scale bar=2 cm. (FIG. 6F) FACS analysis of intratumoral OT-I T cells in B16-F10-OVA tumors isolated 4 days after ACT. Groups n=5-6. #p<0.0001 versus PBS control, **p<0.01. All graphs show mean±SEM.

(FIGS. 7A-7B) PlexinA2 mRNA expression in CD8+ T-cells in tissues of normal and tumor-bearing mice. (FIG. 7A) PlexinA2 mRNA expression is high in FACS sorted CD8+ T cells from blood as compared to LNs and spleen of healthy WT mice. (FIG. 7B) PlexinA2 is highly expressed in FACS sorted CD8+ T cells from blood while expressed at a lower level in sorted CD8+ T cells from lymph node (LN), tumor-draining LNs, spleen and primary tumor of subcutaneous LLC tumor-bearing WT mice. (FIGS. 7C-7D) Effect of CD8-positive T-cell-specific deletion of PlxnA2 on tumor volume (FIG. 7C) and tumor weight (FIG. 7D) in a subcutaneous MC38 colon adenocarcinoma tumor model. (FIGS. 7E-7F) Effect of CD8-positive T-cell-specific deletion of PlxnA2 on tumor volume (FIG. 7E) and tumor weight (FIG. 7F) in a orthotopic E0771 breast tumor model (FIGS. 7G-7H) Tumor-infiltration of CD8+ T cells in PlxA2 lox/lox and PlxnA2+/+ mice containing E0771 tumors (percentage of live cells). FACS analysis of E0771 tumors (sacrifice at day 16) with a specific deletion of CD8+ T cells showed increased number of blood circulating CD8+ T-cells (FIG. 7H) and more CD8+ T-cell infiltration in the primary tumor (FIG. 7G) as compared to their littermate controls.

(FIGS. 8A-8C) Plxna4 expression in $CD8^+$ T cells sorted from different tissues in LLC tumor-bearing WT mice (FIG. 8A), in circulating $CD8^+$ T cells sorted from healthy, orthotopic B16-F10 and subcutaneous LLC tumor-bearing WT mice (FIG. 8B), and in sorted $CD8^+CD44^-$ and $CD8^+CD44^+$ cells from the circulation of B16-F10 tumor-bearing WT mice (FIG. 8C). (FIG. 8D) Plxna4 expression in purified $CD8^+$ WT T cells before and after in vitro activation with CD3/CD28 beads. For the in vivo experiments, n=3-4 mice per group were used (FIGS. 8A-8C). In vitro results (FIG. 8D) were performed in triplicates and are representative of two independent experiments. *p<0.05, p<0.01 and *p<0.001 versus circulating $CD8^+$ T cells (FIG. 8A), circulating $CD8^+$ T cells in healthy mice (FIG. 8B), circulating CD8+CD44− cells (FIG. 8C) and naïve $CD8^+$ T cells (FIG. 8D). All graphs show mean±SEM.

(FIG. 9A and FIG. 9B) Expression of Plxna4 in isolated $CD8^+$ T cells from the circulation of treatment-naïve melanoma patients and healthy controls (FIG. 9A) and from naïve and ICIs-treated melanoma patients (FIG. 9B). n=6 healthy controls, n=23 naïve melanoma patients and n=14 αPD-1/CTLA-4-treated melanoma patients. *p<0.05 versus circulating $CD8^+$ T cells in healthy individuals (FIG. 9A) and in naïve melanoma patients (FIG. 9B). All graphs show mean±SEM.

DETAILED DESCRIPTION OF THE INVENTION

Figure 1A:
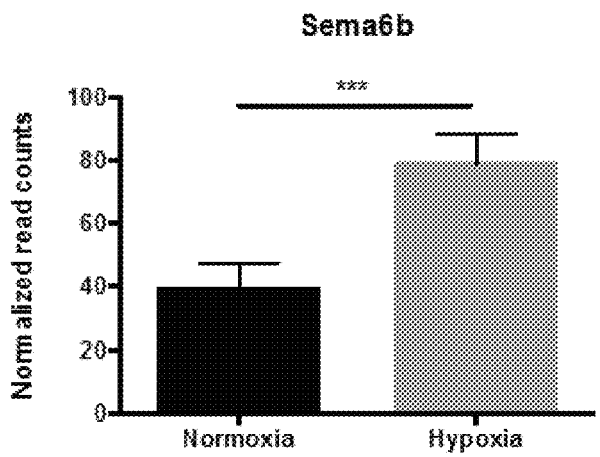
FIGS. 1A-1C. Hypoxic upregulation of Sema6B. Top panel (FIG. 1A): Expression of Sema 6B in tumor-associated macrophages (TAMs) from subcutaneous LLC tumors under hypoxic and normoxic conditions. Middle (FIG. 1B) and bottom (FIG. 1C) panel: Sema6B mRNA expression in distinct tumor cell lines (LLC, E0771 and Panc05 in middle panel; GL261, KR158B and CT2A in bottom panel) grown under hypoxic and normoxic conditions. Expression is normalized to HPRT house-keeping gene. ***$p<0.001$ versus WT. All graphs show mean±SEM.

Escaping from the immune system is a hallmark of cancer as immune cells carry the potential to limit tumor progression. Nevertheless, the immunosuppressive tumor microenvironment can hamper the efficiency of immunotherapy. In work leading to the present invention, the potential of targeting of plexin-A4 (PlxnA4) and plexin-A2 (PlxnA2), both known as repulsive guidance molecules, to increase anti-tumor immunity was shown. PlxnA4 or PlxnA2 deficiency in the stroma reduced tumor growth in several tumor models and this reduction was accompanied by an increased infiltration of CD8-positive (CD8+) T-cells. Furthermore, deletion of PlxnA4 or PlxnA2 in CD8+ T-cells was shown to be sufficient to increase their migratory capacity towards the lymph nodes/tumors, as well as their proliferation, contributing to an increased activation and leading to more effective anti-tumor responses. Finally, adoptive transfer of CD8+ T-cells in which PlxnA4 was knocked-out, was sufficient for an effective anti-tumor response.

In light of the above, the invention in one aspect relates to isolated CD8-positive (CD8+) T-cells characterized by lacking functional plexin-A2 and/or functional plexin-A4, or characterized by substantially lacking functional plexin-A2 and/or functional plexin-A4. It is understood that it may not be required for the isolated CD8+ T-cells to be fully devoid of functional plexin-A2 and/or functional plexin-A4. In particular, it may suffice that the amount of functional plexin-A2 and/or of functional plexin-A4 protein is reduced by at least 90%, at least 80%, at least 70%, at least 60%, at least 50%, or even less, such as by at least 25%. The reduction is relative to the amount of functional plexin-A2 and/or of functional plexin-A4 protein prior to any action aimed at causing the originally isolated CD8+ T-cells to (substantially) lack functional plexin-A2 and/or functional plexin-A4. The amount of functional plexin-A2 and/or of functional plexin-A4 may be determined as the total amount of protein (as present on the surface and inside CD8+ T-cells), as the amount of surface-exposed protein, or as the amount of intracellular protein. In an alternative, not the protein amount is measured but the amount of plexin-A2 mRNA and/or of plexin-A4 mRNA is measured as a proxy for the amount of plexin-A2 protein and/or of plexin-A4 protein. mRNA amounts, however, are not necessarily under all circumstances a reliable proxy for protein amounts.

As already briefly alluded to above, the (substantial) lack of functional plexin-A2 and/or of functional plexin-A4 in the isolated CD8+ T-cells normally requires human intervention. In particular, CD8+ T-cells (precursor cells of the CD8+ T-cells of the invention) are forced to (substantially) lack functional plexin-A2 and/or functional plexin-A4 by means of an ex-vivo human intervention. The (substantial) lack of functional plexin-A2 and/or functional plexin-A4 in the isolated CD8+ T-cells of the invention thus is in particular obtained ex-vivo. Even more in particular, the lack of functional plexin-A2 and/or of functional plexin-A4 in the isolated CD8+ T-cells of the invention is obtained by genetic modification, by pharmacological inhibition or by pharmacologic knock-down.

Pharmacological inhibition in general occurs by means of an agent inhibiting plexin-A2 and/or plexin-A4. In particular, such pharmacological inhibitor is binding, such as specifically binding to plexin-A2 and/or to plexin-A4. Such binding may occur with high affinity although this is not an absolute requirement. Likewise possible, but not absolutely required, such binding may induce internalization of plexin-A2 and/or plexin-A4. The pharmacological inhibitor of plexin-A2 and/or plexin-A4 may for instance have a binding affinity (dissociation constant) to (one of) its target of about 1000 nM or less, a binding affinity of about 100 nM or less, a binding affinity of about 50 nM or less, a binding affinity of about 10 nM or less, or a binding affinity of about 1 nM or less. Alternatively, the pharmacological inhibitor of plexin-A2 and/or plexin-A4 may exert the desired level of inhibition of plexin-A2 and/or of plexin-A4 with an IC50 of 1000 nM or less, with an IC50 of 500 nM or less, with an IC50 of 100 nM or less, with an IC50 of 50 nM or less, with an IC50 of 10 nM or less, or with an IC50 of 1 nM or less.

In general, the agent inhibiting plexin-A2 and/or plexin-A4 is a polypeptide, a polypeptidic agent, an aptamer, or a combination of any of the foregoing. Examples of such pharmacologic inhibitors or agents inhibiting plexin-A2 and/or plexin-A4 include immunoglobulin variable domains, antibodies or a fragment thereof, alpha-bodies, nanobodies, intrabodies, aptamers, DARPins, affibodies, affitins, anticalins, monobodies, and bicyclic peptides. Inhibition of plexin-A2 and/or plexin-A4 can for example refer to inhibition of binding of ligands to plexin-A2 and/or to plexin-A4 (such as determinable in an assay comprising isolated plexin-A2 and/or isolated plexin-A4 protein (or isolated parts of such proteins such as isolated soluble parts of such proteins); or such as determinable in an assay relying on plexin-A2 and/or plexin-A4 expressed, such as recombinantly expressed, in or on a cell, on a phage, . . . ), or can for example refer to functional inhibition. Some of these assays have been employed in the Examples hereinafter.

Pharmacologic knock-down in general occurs by means of an agent inducing (proteolytic) degradation of plexin-A2 and/or plexin-A4.

Genetic modification (of precursor CD8+ T-cells) in order to arrive at the CD8+ T-cells of the invention include genetic knock-out, genetic mutation or genetic silencing of the plexin-A2 and/or plexin-A4 encoding gene. Such genetic modification can for instance be obtained by means of homologous recombination, by means of RNA interference, or by means of a nuclease (such as Cas9 or other Cas, Argonaute, CRISPR, Crispr-Cas9, TALEN effector nuclease, transposase, ZEN, a meganuclease, or Mega-Tal). In an alternative (not excluding combination with other genetic modifications), the genetic modification (of precursor CD8+ T-cells) in order to arrive at the CD8+ T-cells of the invention is based on the introduction of a genetic construct capable of driving expression of an agent inhibiting plexin-A2 and/or plexin-A4 by the CD8+ T-cells of the invention. In a particular setting, the expression of an agent inhibiting plexin-A2 and/or plexin-A4 by the CD8+ T-cells of the invention is driven by a tumor-specific promoter (i.e. a promoter that is selectively activated in a tumor environment or in a tumor microenvironment).

The isolated CD8+ T-cells of the invention, i.e. isolated CD8+ T-cells (substantially) lacking functional plexin-A2 and/or functional plexin-A4 may comprise further genetic modifications. Such further genetic modifications for instance are genetic engineering in order for the CD8+ T-cells of the invention to express an anti-tumor T-cell receptor (TCR) and/or a chimeric antigen receptor (CAR). Anti-tumor T-cell receptors are, apart from being specific for a tumor antigen presented by the patient's own MHC molecules, and apart from normally being absent from the precursor CD8+ T-cell of the engineered CD8+ T-cell, "conventional" T-cell receptors. Engineering expression of an anti-tumor TCR in a CD8+ T-cells normally requires identification of a suitable tumor antigen. A chimeric antigen receptor usually comprises an ectodomain recognizing a tumor antigen (the part of the CAR normally not present on a CD8+ T-cell), and a transmembrane domain and endodomain which find their origin from a CD8+ T-cell. In any of the above, the precursor CD8+ T-cells (not modified to (substantially) lack functional plexin-A2 and/or functional plexin-A4), can be of autologous origin, or from allogenic origin. When of autologous origin, the precursor CD8+ T-cells can be obtained from a subject having a tumor or cancer, or alternatively, can be obtained from a tumor or cancer of a subject having a tumor or cancer.

In a further aspect, the invention relates to populations of CD8+ T-cells obtained by ex-vivo expansion of an isolated CD8+ T-cell according to the invention as described above, i.e. at least modified to (substantially) lack functional plexin-A2 and/or functional plexin-A4.

Some of the terms as used hereinabove are now explained before describing the further aspects of the invention.

Plexins

Plexins are membrane proteins known as being involved in semaphorin (Sema) signaling, a process that involves co-receptors such as neuropilins (Nrps) as well as receptor tyrosine kinases (RTKs) such as VEGFR2, Met, ErbB2 and off-track (OTK). Semaphorins are involved in regulating morphology and motility of a plethora of cell types. Four classes (A to D) of plexins are known in vertebrates (Alto & Terman 2017, Methods Mol Biol 1493:1-25). As shown in FIG. 1 of Alto & Terman 2017, and in its generality, interactions of plexins-A2 and -A4 have been reported with semaphorins of classes 3 and 6 (Sema3, Sema6) in vertebrates, as well of plexin-A4 with semaphorins of class 5 (Sema5) in invertebrates. Further in its generality, the interaction of plexins-A2 and -A4 with the soluble Sema3 can further involve neuropilins-1 and -2, RTKs, integrins, B7-H4, proteoglycans and cell adhesion molecules as (co-) receptors. Likewise, the interaction of plexins-A2 and -A4 with Sema6 can further involve RTKs and TREM2 (triggering receptor expressed on myeloid cells 2) as (co-)receptors; whereas the interaction of plexins-A4 with Sema5 (in invertebrates) can further involve neuropilin-2, RTKs, and proteoglycans (FIG. 1 of Alto & Terman 2017, Methods Mol Biol 1493:1-25). When zooming in on the semaphorins, plexins-A2 and -A4 appear to interact with Sema3A, Sema3D, Sema6A and Sema6B; in different plexin complexes, plexin-A4 further appears to interact with Sema3C, Sema3F, Sema6D and (invertebrate) Sema5B (Table 1 of Hota & Buck 2012, Cell Mol Life Sci 69:3765-3805; Smolkin et al. 2018, J Cell Sci 131:jcs208298; Kang et al. 2018, Nat Immunol 19:561-570).

Plexin-A2: the GeneCards Human Genome Database provides “Plexin A2”, “Semaphorin Receptor OCT”, “Transmembrane Protein OCT”, “Plexin 2”, “PLXN2”, “OCT”, and “KIAA0463” as aliases for PLXNA2. The GenBank reference PLXNA2 mRNA sequence is known under accession no. NM_025179.4.

Plexin-A4: the GeneCards Human Genome Database provides “Plexin A4”, “PLXNA4A”, “PLXNA4B”, “Epididymis Secretory Sperm Binding Protein”, “FAYV2820”, “PR034003”, “KIAA1550”, and “PLEXA4” as aliases for PLXNA4. The GenBank reference PLXNA4 mRNA sequences are known under accession nos. NM_001105543.1, NM_020911.1, and NM_181775.3.

Functional Plexin-A2 and Functional Plexin-A4

Functional plexin-A2 or plexin-A4, as referred to herein, is defined as plexin-A2 or plexin-A4 that is expressed and to which no “foreign” (in the sense of non-naturally occurring, artificially made, man-made, or any combination thereof) compound such as pharmacological inhibitor is bound or linked, wherein the “foreign” compound is capable of interfering directly (e.g. competing) or indirectly (e.g. by inducing degradation of plexin-A2 or plexin-A4) with the binding of plexin-A2 or plexin-A4 with any one of its potential natural binding partners (see hereinabove; and further including for instance, binding to itself in case of homo-(di-)merization, or to one-another in case of hetero-(di-) merization). Functional plexin-A2 or plexin-A4 may be exposed on the surface of CD8+ T-cells, or may be stored inside CD8+ T-cells such as stored in a manner allowing quick release to the cell surface.

As such, functional plexin-A2 or functional plexin-A4 can be lacking on and/or in a cell by repressing, inhibiting, or blocking expression of plexin-A2 or plexin-A4, or by binding of a “foreign” compound (as meant hereinabove) to plexin-A2 or plexin-A4. In particular, functional plexin-A2 and/or plexin-A4 is lacking, or is substantially lacking, on and/or in the isolated CD8+ T-cells of the invention.

Genetic modification of CD8+ T-cells isolated from a subject is one means of forcing the CD8+ T-cells to lack functional plexin-A2 and/or plexin-A4. Such genetic modification can be aimed at repressing, reducing, or inhibiting ongoing expression of plexin-A2 and/or plexin-A4 in the isolated (unmodified) CD8+ T-cells, and/or can be aimed at preventing or inhibiting de novo expression of plexin-A2 and/or plexin-A4, e.g. in case expression of plexin-A2 and/or plexin-A4 is low or non-existing in the isolated (unmodified) CD8+ T-cells. In this context, when the isolated CD8+ T-cells are expanded in vitro or ex vivo, it is understood that the genetic modification may occur prior to expansion, such as in case of stable genetic modification. When the genetic modification is relying on e.g. RNA interference mechanisms, the isolated CD8+ T-cells may need to be expanded in the continuous presence of the RNA interference agent.

Shielding (part of the) plexin-A2 and/or plexin-A4 protein exposed on the surface of CD8+ T-cells and/or stored within CD8+ T-cells by means of contacting the CD8+ T-cells with a pharmacological inhibitor of plexin-A2 and/or plexin-A4 is another means of causing CD8+ T-cells to lack functional plexin-A2 and/or plexin-A4. The said shielding can be envisaged as neutralizing (part of the) plexin-A2 and/or plexin-A4 protein for interaction with other (natural) binding partners. In this context, when the isolated CD8+ T-cells are expanded in vitro or ex vivo, it is understood that the contacting with the pharmacological inhibitor is continuous during the expansion of the CD8+ T-cells, or is occurring after expansion of the CD8+ T-cells. Such pharmacological inhibitors perse are known in the art, see e.g. WO 2012/114339 and WO 2015/037009 as discussed in the Background section, and alternatives are discussed in more detail hereinafter. In particular, such pharmacological inhibitors bind to plexin-A2 and/or plexin-A4 with high specificity and/or, optionally, with high affinity. Concurrent binding of a single inhibitor to both plexin-A2 and plexin-A4 is not excluded as such inhibitor can be bispecific.

Plexin-A2 and/or plexin-A4 protein present inside CD8+ T-cells or on the surface of CD8+ T-cells can further be the target of pharmacologic knock-down such as by molecules or agents inducing specific proteolytic degradation of plexin-A2 and/or plexin-A4 protein. In this context, when the isolated CD8+ T-cells are expanded in vitro or ex vivo, it is understood that the contacting with the pharmacological knock-down agent is continuous during the expansion of the CD8+ T-cells, or is occurring after expansion of the CD8+ T-cells.

The agent causing CD8+ T-cell to (substantially) lack functional plexin-A2 and/or plexin-A4 or causing neutralization of plexin-A2 and/or of plexin-A4 as referred to herein may be part of a larger molecule further comprising a moiety directing the agent to CD8+ T-cells.

Polypeptide, Polypeptidic Molecule or Agent

A polypeptide in general is a molecule comprising at least one polypeptidic bond (condensation of non-side chain carboxyl of one amino acid and non-side chain amino group of second amino acid) between two adjacent amino acids. A polypeptidic agent in general is (i) a molecule comprising at least one polypeptidic bond between two adjacent amino acids wherein one of the amino acids cannot be incorporated in the polypeptidic agent by means of translation/biological production in a cell (which can also be referred to as non-natural amino acid), (ii) a molecule comprising at least one non-natural polypeptidic bond (between natural amino acids, between a natural amino acid and a non-natural amino acid, or between two non-natural amino acids), or (iii) a molecule comprising at least one polypeptidic bond between two adjacent amino acids (between natural amino acids, between a natural amino acid and a non-natural amino acid, or between two non-natural amino acids) and further comprising a non-peptidic moiety.

Polypeptides or polypeptidic molecules may comprise intramolecular disulfide bonds, or may be connected to other polypeptides or polypeptidic molecules by e.g. intermolecular disulfide bonds. Synthesis of a polypeptide or polypeptidic molecule may be synthetic. Standard protein chemistry may be used to introduce an activatable N- or C-terminus. Alternatively additions may be made by fragment condensation or native chemical ligation e.g. as described in (Dawson et al. 1994, Science 266:776-779), or by enzymes, for example using subtiligase (Chang et al. 1994, PNAS 91:12544-8; Hikari et al. 2008, Bioorg Med Chem Lett 18:6000-6003). Alternatively, the peptides may be extended or modified by further conjugation through disulphide bonds. This has the additional advantage of allowing the first and second peptide to dissociate from each other once within the reducing environment of the cell. Furthermore, addition of e.g. drugs or other moieties may be accomplished in the same manner, using appropriate chemistry, coupling at the N- or C-termini or via side chains. Suitably the coupling is conducted in such a manner that it does not block the activity of either entity. The unnatural amino acids incorporated into peptides and proteins may include 1) a ketone functional group (as found in para or meta acetyl-phenylalanine) that can be specifically reacted with hydrazines, hydroxylamines and their derivatives (Wang et al. 2003, PNAS 100:56-61; Zeng et al. 2006, Bioorg Med Chem Lett 16:5356-5359), 2) azides (as found in p-azido-phenylalanine) that can be reacted with alkynes via copper catalysed "click chemistry" or strain promoted (3+2) cycloadditions to form the corresponding triazoles (Chin et al. 2002, J Am Chem Soc 124:9026-7; Deiters et al. 2003, J Am Chem Soc 125:11782-3), or azides that can be reacted with aryl phosphines, via a Staudinger ligation (Tsao et al. 2005, Chembiochem 6:2147-9), to form the corresponding amides, 4) alkynes that can be reacted with azides to form the corresponding triazole (Deiters & Schultz 2005, Bioorg Med Chem Lett 15:1521-4), 5) boronic acids (boronates) than can be specifically reacted with compounds containing more than one appropriately spaced hydroxyl group or undergo palladium mediated coupling with halogenated compounds (Brustad et al. 2008, Angew Chem Int Ed Engl 47:8220-3), 6) metal chelating amino acids, including those bearing bipyridyls, that can specifically co-ordinate a metal ion (Xie et al. 2007, Angew Chem Int Ed Engl 46:9239-42).

Unnatural amino acids may be incorporated into proteins and peptides displayed on phage by transforming *E. coli* with plasmids or combinations of plasmids bearing: 1) the orthogonal aminoacyl-tRNA synthetase and tRNA that direct the incorporation of the unnatural amino acid in response to a codon, 2) the phage DNA or phagemid plasmid altered to contain the selected codon at the site of unnatural amino acid incorporation (Liu et al. 2008, PNAS 105:17688-93; Tian et al. 2004, J Am Chem Soc 126(49): 15962-3). The orthogonal aminoacyl-tRNA synthetase and tRNA may be derived from the *Methancoccus janaschii* tyrosyl pair or a synthetase (Chin et al. 2002, PNAS 99:11020-4) and tRNA pair that naturally incorporates pyrrolysine (Yanagisawa et al. 2008, Chem Biol 15:1187-97; Neumann et al. 2008, Nat Chem Biol 4:232-4). The codon for incorporation may be the amber codon (UAG) another stop codon (UGA, or UAA), alternatively it may be a four-base codon. The aminoacyl-tRNA synthetase and tRNA may be produced from existing vectors, including the pBK series of vectors, pSUP (Ryu & Schultz 2006, Nat Methods 3:263-5) vectors and pDULE vectors (Farell et al. 2005, Nat Methods 2:377-84). The *E. coli* strain used will express the F' pilus (generally via a tra operon). When amber suppression is used the *E. coli* strain will not itself contain an active amber suppressor tRNA gene. The amino acid will be added to the growth media, preferably at a final concentration of 1 mM or greater. Efficiency of amino acid incorporation may be -enhanced by using an expression construct with an orthogonal ribosome binding site and translating the gene with ribo-X (Wang et al. 2007, Nat Biotechnol 25:770-7). This may allow efficient multi-site incorporation of the unnatural amino acid.

Non-natural amino acids include D-amino acids (although some can be incorporated into peptidic molecules by some bacteria); N-methyl or N-alkyl amino acids; constrained amino acid side chains such as proline analogues, bulky side-chains, Calpha-substituted derivatives (e.g. a simple derivative is Aib (2-aminoisobutyric acid), H2N—C(CH3) 2-COOH); and cyclo amino acids (a simple derivative being amino-cyclopropylcarboxylic acid).

Non-natural peptidic bond or peptide surrogate bonds include N-alkylation (CO—NR), reduced peptide bonds (CH2-NH—), peptoids (N-alkyl amino acids, NR—CH2-CO), thio-amides (CS—NH), azapeptides (CO—NH—NR), trans-alkene (RHC=C—), retro-inverso (NH—CO), urea surrogates (NH—CO—NHR). The peptide backbone length may also be modulated, i.e. $\beta^{2,3}$-amino acids, (NH—CR—CH2-CO, NH—CH2-CHR—CO); or backbone conformation may be constrained by e.g. substitutions on the alpha-carbon on amino acids (e.g. Aib). Non-peptidic moiety, in general, is any moiety different from an amino acid (natural or non-natural) or modification introduced to obtain a non-natural peptidic bond or altered backbone length. Non-peptidic moieties include e.g. capping or blocking groups, polyethyleneglycol (PEG) groups, drugs, molecular scaffolding moieties and the like.

Pharmacologic Inhibition of Plexin-A2 and/or Plexin-A4

Hereinafter different types of molecules that can be designed to inhibit Plexin-A2 or Plexin-A4 are described. Combinations of different molecules (of the same type or from a different type) each individually inhibiting either Plexin-A2 or Plexin-A4 are possible, thus creating a Plexin-A2- and Plexin-A4-inhibiting mixture of molecules. Intramolecular combinations of different molecules (of the same type or from a different type) each individually inhibiting either Plexin-A2 or Plexin-A4 are also possible, thus creating Plexin-A2- and Plexin-A4-inhibiting molecules.

The term "antibody" as used herein, refers to an immunoglobulin (Ig) molecule, which specifically binds with an antigen. Antibodies can be intact immunoglobulins derived from natural sources or from recombinant sources and can be immunoreactive portions of intact immunoglobulins. Antibodies are typically tetramers of immunoglobulin molecules. The term "immunoglobulin domain" as used herein refers to a globular region of an antibody chain (such as e.g., a chain of a conventional 4-chain antibody or a chain of a heavy chain antibody), or to a polypeptide that essentially consists of such a globular region. Immunoglobulin domains are characterized in that they retain the immunoglobulin fold characteristic of antibody molecules, which consists of a two-layer sandwich of about seven antiparallel β-strands arranged in two β-sheets, optionally stabilized by a conserved disulphide bond.

The specificity of an antibody/immunoglobulin/immunoglobulin variable domain (IVD) for an antigen is defined by the composition of the antigen-binding domains in the antibody/immunoglobulin/IVD (usually one or more of the CDRs, the particular amino acids of the antibody/immunoglobulin/IVD interacting with the antigen forming the paratope) and the composition of the antigen (the parts of the antigen interacting with the antibody/immunoglobulin/IVD forming the epitope). Specificity of binding is understood to refer to a binding between an antibody/immunoglobulin/IVD with a single target molecule or with a limited number of target molecules that (happen to) share an epitope recognized by the antibody/immunoglobulin/IVD.

Affinity of an antibody/immunoglobulin/IVD for its target is a measure for the strength of interaction between an epitope on the target (antigen) and an epitope/antigen binding site in the antibody/immunoglobulin/IVD. It can be defined as:

$$K_A = \frac{[Ab - Ag]}{[Ab][Ag]}$$

Wherein KA is the affinity constant, [Ab] is the molar concentration of unoccupied binding sites on the antibody/immunoglobulin/IVD, [Ag] is the molar concentration of unoccupied binding sites on the antigen, and [Ab-Ag] is the molar concentration of the antibody-antigen complex.

Avidity provides information on the overall strength of an antibody/immunoglobulin/IVD-antigen complex, and generally depends on the above-described affinity, the valency of antibody/immunoglobulin/IVD and of antigen, and the structural interaction of the binding partners. The term "immunoglobulin variable domain" (abbreviated as "IVD") as used herein means an immunoglobulin domain essentially consisting of four "framework regions" which are referred to in the art and herein below as "framework region 1" or "FR1"; as "framework region 2" or "FR2"; as "framework region 3" or "FR3"; and as "framework region 4" or "FR4", respectively; which framework regions are interrupted by three "complementarity determining regions" or "CDRs" which are referred to in the art and herein below as "complementarity determining region 1" or "CDR1"; as "complementarity determining region 2" or "CDR2"; and as "complementarity determining region 3" or "CDR3", respectively. Thus, the general structure or sequence of an immunoglobulin variable domain can be indicated as follows: FR1-CDR1-FR2-CDR2-FR3-CDR3-FR4. It is the immunoglobulin variable domain(s) (IVDs) that confer specificity to an antibody for the antigen by carrying the antigen-binding site. Methods for delineating/confining a CDR in an antibody/immunoglobulin/IVD have been described in the art (and include the Kabat, Chothia, IMTG, Martin, Gelfand, and Honneger systems; see Dondelinger et al. 2018, Front Immunol 9:2278).

The term "immunoglobulin single variable domain" (abbreviated as "ISVD"), equivalent to the term "single variable domain", defines molecules wherein the antigen binding site is present on, and formed by, a single immunoglobulin domain. This sets immunoglobulin single variable domains apart from "conventional" immunoglobulins or their fragments, wherein two immunoglobulin domains, in particular two variable domains, interact to form an antigen binding site. Typically, in conventional immunoglobulins, a heavy chain variable domain (VH) and a light chain variable domain (VL) interact to form an antigen binding site. In this case, the complementarity determining regions (CDRs) of both VH and VL will contribute to the antigen binding site, i.e. a total of 6 CDRs will be involved in antigen binding site formation. In view of the above definition, the antigen-binding domain of a conventional 4-chain antibody (such as an IgG, IgM, IgA, IgD or IgE molecule; known in the art) or of a Fab fragment, a F(ab')2 fragment, an Fv fragment such as a disulphide linked Fv or a scFv fragment, or a diabody (all known in the art) derived from such conventional 4-chain antibody, would normally not be regarded as an immunoglobulin single variable domain, as, in these cases, binding to the respective epitope of an antigen would normally not occur by one (single) immunoglobulin domain but by a pair of (associated) immunoglobulin domains such as light and heavy chain variable domains, i.e., by a VH-VL pair of immunoglobulin domains, which jointly bind to an epitope of the respective antigen. In contrast, immunoglobulin single variable domains are capable of specifically binding to an epitope of the antigen without pairing with an additional immunoglobulin variable domain. The binding site of an immunoglobulin single variable domain is formed by a single VH/VHH or VL domain. Hence, the antigen binding site of an immunoglobulin single variable domain is formed by no more than three CDRs. As such, the single variable domain may be a light chain variable domain sequence (e.g., a VL-sequence) or a suitable fragment thereof; or a heavy chain variable domain sequence (e.g., a VH-sequence or VHH sequence) or a suitable fragment thereof; as long as it is capable of forming a single antigen binding unit (i.e., a functional antigen binding unit that essentially consists of the single variable domain, such that the single antigen binding domain does not need to interact with another variable domain to form a functional antigen binding unit). In one embodiment of the invention, the immunoglobulin single variable domains are heavy chain variable domain sequences (e.g., a VH-sequence); more specifically, the immunoglobulin single variable domains can be heavy chain variable domain sequences that are derived from a conventional four-chain antibody or heavy chain variable domain sequences that are derived from a heavy chain antibody. For example, the immunoglobulin single variable domain may be a (single) domain antibody (or an amino acid sequence that is suitable for use as a (single) domain antibody), a "dAb" or dAb (or an amino acid sequence that is suitable for use as a dAb) or a Nanobody® (as defined herein, and including but not limited to a VHH); other single variable domains, or any suitable fragment of any one thereof. In particular, the immunoglobulin single variable domain may be a Nanobody® (as defined herein) or a suitable fragment thereof. Note: Nanobody®, Nanobodies® and Nanoclone® are registered trademarks of Ablynx N.V. For a general description of Nanobodies®, reference is made to the further description below, as well as to the prior art cited herein, such as e.g. described in WO2008/020079.

"VHH domains", also known as VHHs, VHH domains, VHH antibody fragments, and VHH antibodies, have originally been described as the antigen binding immunoglobulin (variable) domain of "heavy chain antibodies" (i.e., of "antibodies devoid of light chains"; Hamers-Casterman et al (1993) Nature 363: 446-448). The term "VHH domain" has been chosen to distinguish these variable domains from the heavy chain variable domains that are present in conventional 4-chain antibodies (which are referred to herein as "VH domains") and from the light chain variable domains that are present in conventional 4-chain antibodies (which are referred to herein as "VL domains"). For a further description of VHHs and Nanobody®, reference is made to the review article by Muyldermans (Reviews in Molecular Biotechnology 74: 277-302, 2001), as well as to the following patent applications, which are mentioned as general background art: WO 94/04678, WO 95/04079 and WO 96/34103; WO 94/25591, WO 99/37681, WO 00/40968, WO 00/43507, WO 00/65057, WO 01/40310, WO 01/44301, EP 1134231 and WO 02/48193; WO 97/49805, WO 01/21817, WO 03/035694, WO 03/054016 and WO 03/055527; WO 03/050531 WO 01/90190; WO 03/025020; WO 04/041867, WO 04/041862, WO 04/041865, WO 04/041863, WO 04/062551, WO 05/044858, WO 06/40153, WO 06/079372, WO 06/122786, WO 06/122787 and WO 06/122825. As described in these references, Nanobody® (in particular VHH sequences and partially humanized Nanobody®) can in particular be characterized by the presence of one or more "Hallmark residues" in one or more of the framework sequences. A further description of the Nanobody®, including humanization and/or camelization of Nanobody®, as well as other modifications, parts or fragments, derivatives or "Nanobody® fusions", multivalent constructs (including some non-limiting examples of linker sequences) and different modifications to increase the half-life of the Nanobody® and their preparations can be found e.g. in WO 08/101985 and WO 08/142164. "Domain antibodies", also known as "Dabs" (the terms "Domain Antibodies" and "dAbs" being used as trademarks by the GlaxoSmithKline group of companies) have been described in e.g., EP 0368684, Ward et al. (Nature 341: 544-546, 1989), Holt et al. (Tends in Biotechnology 21: 484-490, 2003) and WO 03/002609 as well as for example WO 04/068820, WO 06/030220, and WO 06/003388. Domain antibodies essentially correspond to the VH or VL domains of non-camelid mammalians, in particular human 4-chain antibodies. In order to bind an epitope as a single antigen binding domain, i.e., without being paired with a VL or VH domain, respectively, specific selection for such antigen binding properties is required, e.g. by using libraries of human single VH or VL domain sequences. Domain antibodies have, like VHHs, a molecular weight of approximately 13 to approximately 16 kDa and, if derived from fully human sequences, do not require humanization for e.g. therapeutic use in humans. It should also be noted that single variable domains can be derived from certain species of shark (for example, the so-called "IgNAR domains", see for example WO 05/18629).

Immunoglobulin single variable domains such as Domain antibodies and Nanobody® (including VHH domains and humanized VHH domains), can be subjected to affinity maturation by introducing one or more alterations in the amino acid sequence of one or more CDRs, which alterations result in an improved affinity of the resulting immunoglobulin single variable domain for its respective antigen, as compared to the respective parent molecule. Affinity-matured immunoglobulin single variable domain molecules of the invention may be prepared by methods known in the art, for example, as described by Marks et al. (Biotechnology 10:779-783, 1992), Barbas, et al. (Proc. Nat. Acad. Sci, USA 91: 3809-3813, 1994), Shier et al. (Gene 169: 147-155, 1995), Yelton et al. (Immunol. 155: 1994-2004, 1995), Jackson et al. (J. Immunol. 154: 3310-9, 1995), Hawkins et al. (J. Mol. Biol. 226: 889 896, 1992), Johnson and Hawkins (Affinity maturation of antibodies using phage display, Oxford University Press, 1996). The process of designing/ selecting and/or preparing a polypeptide, starting from an immunoglobulin single variable domain such as a Domain antibody or a Nanobody®, is also referred to herein as "formatting" said immunoglobulin single variable domain; and an immunoglobulin single variable domain that is made part of a polypeptide is said to be "formatted" or to be "in the format of" said polypeptide. Examples of ways in which an immunoglobulin single variable domain can be formatted and examples of such formats for instance to avoid glycosylation will be clear to the skilled person based on the disclosure herein. Immunoglobulin single variable domains such as Domain antibodies and Nanobody® (including VHH domains) can be subjected to humanization, i.e. increase the degree of sequence identity with the closest human germline sequence. In particular, humanized immunoglobulin single variable domains, such as Nanobody® (including VHH domains) may be immunoglobulin single variable domains that are as generally defined for in the previous paragraphs, but in which at least one amino acid residue is present (and in particular, at least one framework residue) that is and/or that corresponds to a humanizing substitution (as defined herein). Potentially useful humanizing substitutions can be ascertained by comparing the sequence of the framework regions of a naturally occurring VHH sequence with the corresponding framework sequence of one or more closely related human VH sequences, after which one or more of the potentially useful humanizing substitutions (or combinations thereof) thus determined can be introduced into said VHH sequence (in any manner known perse, as further described herein) and the resulting humanized VHH sequences can be tested for affinity for the target, for stability, for ease and level of expression, and/or for other desired properties. In this way, by means of a limited degree of trial and error, other suitable humanizing substitutions (or suitable combinations thereof) can be determined by the skilled person. Also, based on what is described before, (the framework regions of) an immunoglobulin single variable domain, such as a Nanobody® (including VHH domains) may be partially humanized or fully humanized.

Alphabodies are also known as Cell-Penetrating Alphabodies and are small 10 kDa proteins engineered to bind to a variety of antigens.

Aptamers have been selected against small molecules, toxins, peptides, proteins, viruses, bacteria, and even against whole cells. DNA/RNA/XNA aptamers are single stranded and typically around 15-60 nucleotides in length although longer sequences of 220nt have been selected; they can contain non-natural nucleotides (XNA) as described for antisense RNA. A nucleotide aptamer binding to the vascular endothelial growth factor (VEGF) was approved by FDA for treatment of macular degeneration. Variants of RNA aptamers are spiegelmers are composed entirely of an unnatural L-ribonucleic acid backbone. A Spiegelmer of the same sequence has the same binding properties of the corresponding RNA aptamer, except it binds to the mirror image of its target molecule.

Peptide aptamers consist of one (or more) short variable peptide domains, attached at both ends to a protein scaffold, e.g. the Affimer scaffold based on the cystatin protein fold.

A further variation is described in e.g. WO 2004/077062 wherein e.g. 2 peptide loops are attached to an organic scaffold to arrive at a bicyclic peptide (which can be further multimerized). Phage-display screening of such peptides yielding bicyclic peptides binding with high-affinity to a target has proven to be possible in e.g. WO 2009/098450.

DARPins stands for designed ankyrin repeat proteins. DARPin libraries with randomized potential target interaction residues, with diversities of over 10 variants, have been generated at the DNA level. From these, DARPins can be selected for binding to a target of choice with picomolar affinity and specificity. Affitins, or nanofitins, are artificial proteins structurally derived from the DNA binding protein Sac7d, found in *Sulfolobus acidocaldarius*. By randomizing the amino acids on the binding surface of Sac7d and subjecting the resulting protein library to rounds of ribosome display, the affinity can be directed towards various targets, such as peptides, proteins, viruses, and bacteria.

Anticalins are derived from human lipocalins which are a family of naturally binding proteins and mutation of amino acids at the binding site allows for changing the affinity and selectivity towards a target of interest. They have better tissue penetration than antibodies and are stable at temperatures up to 70° C.

Monobodies are synthetic binding proteins that are constructed starting from the fibronectin type III domain (FN3) as a molecular scaffold.

Affibodies are composed of alpha helices and lack disulfide bridges and are based on the Z or IgG-binding domain scaffold of protein A wherein amino acids located in the parental binding domain are randomized. Screening for affibodies binding to a desired target typically is performed using phage display.

Intrabodies are antibodies binding and/or acting to intracellular target; this typically requires the expression of the antibody within the target cell, which can be accomplished by gene therapy/genetic modification.

Pharmacologic Knock-Down of Plexin-A2 and/or Plexin-A4

Several technologies can be applied to cause pharmacologic knock-down of plexin-A2 and/or plexin-A4. Outlined hereafter are the general principles of agents causing pharmacologic knock-down of a target protein by means of inducing (proteolytic) degradation of that target protein.

A proteolysis targeting chimera, or PROTAC, is a chimeric polypeptidic molecule comprising a moiety recognized by an ubiquitin ligase and a moiety binding to a target protein. Interaction of the PROTAC with the target protein causes it to be poly-ubiquinated followed by proteolytic degradation by a cell's own proteasome. As such, a PROTAC provides the possibility of pharmacologically knocking down a target protein. The moiety binding to a target protein can be a peptide or a small molecule (reviewed in, e.g., Zou et al. 2019, Cell Biochem Funct 37:21-30). Other such target protein degradation inducing technologies include dTAG (degradation tag; see, e.g., Nabet et al. 2018, Nat Chem Biol 14:431), Trim-Away (Clift et al. 2017, Cell 171:1692-1706), chaperone-mediated autophagy targeting (Fan et al. 2014, Nat Neurosci 17:471-480) and SNIPER (specific and non-genetic inhibitor of apoptosis protein (IAP)-dependent protein erasers; Naito et al. 2019, Drug Discov Today Technol, doi:10.1016/j.ddtec.2018.12.002).

Lysosome targeting chimeras, or LYTACs, are chimeric molecules comprising a moiety binding to a lysosomal targeting receptor (LTR) and a moiety binding to a target protein (such as an antibody). Interaction of the LYTAC with the target protein causes it to be internalized followed by lysosomal degradation. A prototypic LTR is the cation-independent mannose-6-phosphate receptor (ciMPR) and an LTR binding moiety is e.g. an agonist glycopeptide ligand of ciMPR. The target protein can be a secreted protein or a membrane protein (see, e.g., Banik et al. 2019, doi.org/10.26434/chemrxiv.7927061.v1).

Genetic Inhibition of Plexin-A2 and/or of Plexin-A4

Genetic inhibition of plexin-A2 and/or plexin-A4 in the context of the current invention can be obtained, in particular ex-vivo, by fairly standard technologies of which some are detailed hereinafter.

Downregulating expression of a gene encoding a target is feasible through gene therapy (e.g., by administering siRNA, shRNA or antisense oligonucleotides to the target gene) and through gene therapeutic antagonists include such entities as antisense oligonucleotides, gapmers, siRNA, shRNA, zinc-finger nucleases, meganucleases, TAL effector nucleases, CRISPR-Cas effectors, and nucleic acid aptamers.

One process of modulating/downregulating expression of a gene of interest relies on antisense oligonucleotides (ASOs), or variants thereof such as gapmers. An antisense oligonucleotide (ASO) is a short strand of nucleotides and/or nucleotide analogues that hybridizes with the complementary mRNA in a sequence-specific manner via Watson-Crick base pairing. Formation of the ASO-mRNA complex ultimately results in downregulation of target protein expression (Chan et al. 2006, Clin Exp Pharmacol Physiol 33:533-540; this reference also describes some of the software available for assisting in design of ASOs). Modifications to ASOs can be introduced at one or more levels: phosphate linkage modification (e.g. introduction of one or more of phosphodiester, phosphoramidate or phosphorothioate bonds), sugar modification (e.g. introduction of one or more of LNA (locked nucleic acids), 2'-O-methyl, 2'-O-methoxy-ethyl, 2'-fluoro, S-constrained ethyl or tricyclo-DNA and/or non-ribose modifications (e.g. introduction of one or more of phosphorodiamidate morpholinos or peptide nucleic acids). The introduction of 2'-modifications has been shown to enhance safety and pharmacologic properties of antisense oligonucleotides. Antisense strategies relying on degradation of mRNA by RNase H requires the presence of nucleotides with a free 2'-oxygen, i.e. not all nucleotides in the antisense molecule should be 2'-modified. The gapmer strategy has been developed to this end. A gapmer antisense oligonucleotide consists of a central DNA region (usually a minimum of 7 or 8 nucleotides) with (usually 2 or 3) 2'-modified nucleosides flanking both ends of the central DNA region. This is sufficient for the protection against exonucleases while allowing RNAseH to act on the (2'-modification free) gap region. Antidote strategies are available as demonstrated by administration of an oligonucleotide fully complementary to the antisense oligonucleotide (Crosby et al. 2015, Nucleic Acid Ther 25:297-305). Another process to modulate expression of a gene of interest is based on the natural process of RNA interference. It relies on double-stranded RNA (dsRNA) that is cut by an enzyme called Dicer, resulting in double stranded small interfering RNA (siRNA) molecules which are 20-25 nucleotides long. siRNA then binds to the cellular RNA-Induced Silencing Complex (RISC) separating the two strands into the passenger and guide strand. While the passenger strand is degraded, RISC is cleaving mRNA specifically at a site instructed by the guide strand. Destruction of the mRNA prevents production of the protein of interest and the gene is 'silenced'. siRNAs are dsRNAs with 2 nt 3' end overhangs whereas shRNAs are dsRNAs that contains a loop structure that is processed to siRNA. shRNAs are introduced into the nuclei of target cells using a vector (e.g. bacterial or viral) that optionally can stably integrate into the genome. Apart from checking for lack of cross-reactivity with non-target genes, manufacturers of RNAi products provide guidelines for designing siRNA/shRNA. siRNA sequences between 19-29 nt are generally the most effective. Sequences longer than 30 nt can result in nonspecific silencing. Ideal sites to target include AA dinucleotides and the 19 nt 3' of them in the target mRNA sequence. Typically, siRNAs with 3' dUdU or dTdT dinucleotide overhangs are more effective. Other dinucleotide overhangs could maintain activity but GG overhangs should be avoided. Also to be avoided are siRNA designs with a 4-6 poly(T) tract (acting as a termination signal for RNA pol III), and the G/C content is advised to be between 35-55%. shRNAs should comprise sense and antisense sequences (advised to each be 19-21 nt in length) separated by loop structure, and a 3' AAAA overhang. Effective loop structures are suggested to be 3-9 nt in length. It is suggested to follow the sense-loop-antisense order in designing the shRNA cassette and to avoid 5' overhangs in the shRNA construct. shRNAs are usually transcribed from vectors, e.g. driven by the Pol III U6 promoter or H1 promoter. Vectors allow for inducible shRNA expression, e.g. relying on the Tet-on and Tet-off inducible systems commercially available, or on a modified U6 promoter that is induced by the insect hormone ecdysone. A Cre-Lox recombination system has been used to achieve controlled expression in mice. Synthetic shRNAs can be chemically modified to affect their activity and stability. Plasmid DNA or dsRNA can be delivered to a cell by means of transfection (lipid transfection, cationic polymer-based nanoparticles, lipid or cell-penetrating peptide conjugation) or electroporation. Viral vectors include lentiviral, retroviral, adenoviral and adeno-associated viral vectors.

Ribozymes (ribonucleic acid enzymes) are another type of molecules that can be used to modulate expression of a target gene. They are RNA molecules capable of catalyzing specific biochemical reactions, in the current context capable of targeted cleavage of nucleotide sequences. Examples of ribozymes include the hammerhead ribozyme, the Varkud Satellite ribozyme, Leadzyme and the hairpin ribozyme. Besides the use of the inhibitory RNA technology, modulation of expression of a gene of interest can be achieved at DNA level such as by gene therapy to knock-out or disrupt the target gene. As used herein, a "gene knock-out" can be a gene knockdown or the gene can be knocked out by a mutation such as, a point mutation, an insertion, a deletion, a frameshift, or a missense mutation by techniques such as described hereafter, including, but not limited to, retroviral gene transfer. Another way in which genes can be knocked out is by the use of zinc finger nucleases. Zinc-finger nucleases (ZFNs) are artificial restriction enzymes generated by fusing a zinc finger DNA-binding domain to a DNA-cleavage domain. Zinc finger domains can be engineered to target desired DNA sequences, which enable zinc-finger nucleases to target unique sequence within a complex genome. By taking advantage of the endogenous DNA repair machinery, these reagents can be used to precisely alter the genomes of higher organisms. Other technologies for genome customization that can be used to knock out genes are meganucleases and TAL effector nucleases (TALENs, Cellectis bioresearch). A TALEN® is composed of a TALE DNA binding domain for sequence-specific recognition fused to the catalytic domain of an endonuclease that introduces double strand breaks (DSB). The DNA binding domain of a TALEN® is capable of targeting with high precision a large recognition site (for instance 17 bp). Meganucleases are sequence-specific endonucleases, naturally occurring "DNA scissors", originating from a variety of single-celled organisms such as bacteria, yeast, algae and some plant organelles. Meganucleases have long recognition sites of between 12 and 30 base pairs. The recognition site of natural meganucleases can be modified in order to target native genomic DNA sequences (such as endogenous genes). Another recent genome editing technology is the CRISPR/Cas system, which can be used to achieve RNA-guided genome engineering. CRISPR interference is a genetic technique which allows for sequence-specific control of gene expression in prokaryotic and eukaryotic cells. It is based on the bacterial immune system-derived CRISPR (clustered regularly interspaced palindromic repeats) pathway. Recently, it was demonstrated that the CRISPR-Cas editing system can also be used to target RNA. It has been shown that the Class 2 type VI-A CRISPR-Cas effector C2c2 can be programmed to cleave single stranded RNA targets carrying complementary protospacers (Abudayyeh et al. 2016 Science353/science.aaf5573). C2c2 is a single-effector endoRNase mediating ssRNA cleavage once it has been guided by a single crRNA guide toward the target RNA. Methods for administering nucleic acids include methods applying non-viral (DNA or RNA) or viral nucleic acids (DNA or RNA viral vectors). Methods for non-viral gene therapy include the injection of naked DNA (circular or linear), electroporation, the gene gun, sonoporation, magnetofection, the use of oligonucleotides, lipoplexes (e.g. complexes of nucleic acid with DOTAP or DOPE or combinations thereof, complexes with other cationic lipids), dendrimers, viral-like particles, inorganic nanoparticles, hydrodynamic delivery, photochemical internalization (Berg et al. 2010, Methods Mol Biol 635:133-145) or combinations thereof.

Many different vectors have been used in human nucleic acid therapy trials and a listing can be found on http://www.abedia.com/wiley/vectors.php. Currently the major groups are adenovirus or adeno-associated virus vectors (in about 21% and 7% of the clinical trials), retrovirus vectors (about 19% of clinical trials), naked or plasmid DNA (about 17% of clinical trials), and lentivirus vectors (about 6% of clinical trials). Combinations are also possible, e.g. naked or plasmid DNA combined with adenovirus, or RNA combined with naked or plasmid DNA to list just a few. Other viruses (e.g. alphaviruses, vaccinia viruses such as vaccinia virus Ankara) are used in nucleic acid therapy and are not excluded in the context of the current invention.

Administration may be aided by specific formulation of the nucleic acid e.g. in liposomes (lipoplexes) or polymersomes (synthetic variants of liposomes), as polyplexes (nucleic acid complexed with polymers), carried on dendrimers, in inorganic (nano)particles (e.g. containing iron oxide in case of magnetofection), or combined with a cell penetrating peptide (CPP) to increase cellular uptake. Organ- or cellular-targeting strategies may also be applied to the nucleic acid (nucleic acid combined with organ- or cell-targeting moiety); these include passive targeting (mostly achieved by adapted formulation) or active targeting (e.g. by coupling a nucleic acid-comprising nanoparticle with any compound (e.g. an aptamer or antibody or antigen binding molecule) binding to a target organ- or cell-specific antigen) (e.g. Steichen et al. 2013, Eur J Pharm Sci 48:416-427).

CPPs enable translocation of the drug of interest coupled to them across the plasma membrane. CPPs are alternatively termed Protein Transduction Domains (TPDs), usually comprise 30 or less (e.g. 5 to 30, or 5 to 20) amino acids, and usually are rich in basic residues, and are derived from naturally occurring CPPs (usually longer than 20 amino acids), or are the result of modelling or design. A non-limiting selection of CPPs includes the TAT peptide (derived from HIV-1 Tat protein), penetratin (derived from *Droso-*

*phila* Antennapedia—Antp), pVEC (derived from murine vascular endothelial cadherin), signal-sequence based peptides or membrane translocating sequences, model amphipathic peptide (MAP), transportan, MPG, polyarginines; more information on these peptides can be found in Torchilin 2008 (Adv Drug Deliv Rev 60:548-558) and references cited therein. CPPs can be coupled to carriers such as nanoparticles, liposomes, micelles, or generally any hydrophobic particle. Coupling can be by absorption or chemical bonding, such as via a spacer between the CPP and the carrier. To increase target specificity an antibody binding to a target-specific antigen can further be coupled to the carrier (Torchilin 2008, Adv Drug Deliv Rev 60:548-558). CPPs have already been used to deliver payloads as diverse as plasmid DNA, oligonucleotides, siRNA, peptide nucleic acids (PNA), proteins and peptides, small molecules and nanoparticles inside the cell (Stalmans et al. 2013, PloS One 8:e71752).

Any other modification of the DNA or RNA to enhance efficacy of nucleic acid therapy is likewise envisaged to be useful in the context of the applications of the nucleic acid or nucleic acid comprising compound as outlined herein. The enhanced efficacy can reside in enhanced expression, enhanced delivery properties, enhanced stability and the like. The applications of the nucleic acid or nucleic acid comprising compound as outlined herein may thus rely on using a modified nucleic acid as described above. Further modifications of the nucleic acid may include those suppressing inflammatory responses (hypoinflammatory nucleic acids).

Pharmaceutical Compositions

In yet a further aspect, the invention relates to pharmaceutical compositions comprising any isolated CD8+ T-cell according to the invention as described above, or comprising a population of such CD8+ T-cell as described above. In particular, such pharmaceutical composition comprises besides the CD8+ T-cells as well as a carrier which is both pharmaceutically acceptable (which can be administered to a subject without in itself causing severe side effects) and suitable for supporting stability, and storage if required, of the CD8+ T-cells.

Such pharmaceutical composition can further comprise an anticancer agent (detailed further hereinafter, including chemotherapeutic agent, targeted therapy agent, and immunotherapeutic agent).

Medical Use

Any of the isolated CD8+ T-cell according to the invention (thus at least modified to (substantially) lack functional plexin-A2 and/or plexin-A4), any of the populations of such CD8+ T-cells, or any of the pharmaceutical compositions comprising any such isolated CD8+ T-cell or comprising any such population of isolated CD8+ T-cells, is suitable for any of: (i) for use as medicament, (ii) for use in (a method of) adoptive cell therapy, (iii) for use in (a method of) treating, inhibiting, or suppressing a tumor or cancer; or for any of (iv) use in the manufacture of a medicament, (v) use in the manufacture of a medicament for adoptive cell therapy, or (vi) use in the manufacture of a medicament for treating, inhibiting, or suppressing a tumor or cancer.

When for use in treating, inhibiting, or suppressing a tumor or cancer, (i) any of the isolated CD8+ T-cell according to the invention (thus at least modified to (substantially) lack functional plexin-A2 and/or plexin-A4), (ii) any of the populations of such CD8+ T-cells, or (iii) any of the pharmaceutical compositions comprising any such isolated CD8+ T-cell or comprising any such population of isolated CD8+ T-cells, may further be for use in combination with surgery, radiation, chemotherapy, targeted therapy, immunotherapy, or a further anticancer agent.

Any of the isolated CD8+ T-cell according to the invention (thus at least modified to (substantially) lack functional plexin-A2 and/or plexin-A4), (ii) any of the populations of such CD8+ T-cells, or (iii) any of the pharmaceutical compositions comprising any such isolated CD8+ T-cell or comprising any such population of isolated CD8+ T-cells may also be used in (i) the manufacture of a medicament for use in combination with surgery, radiation, chemotherapy, targeted therapy, immunotherapy, or an anticancer agent, (ii) in the manufacture of a medicament for adoptive cell therapy for use in combination with surgery, radiation, chemotherapy, targeted therapy, immunotherapy, or an anticancer agent, or (iii) in the manufacture of a medicament for treating, inhibiting, or suppressing a tumor or cancer for use in combination with surgery, radiation, chemotherapy, targeted therapy, immunotherapy, or an anticancer agent.

When for use in treating, inhibiting, or suppressing a tumor or cancer, any of (i) surgery, (ii) radiation, (iii) chemotherapy, (iv) targeted therapy, (v) immunotherapy, or (vi) a further anticancer agent may further be for use in combination with (i) any of the isolated CD8+ T-cell according to the invention (thus at least modified to (substantially) lack functional plexin-A2 and/or plexin-A4), (ii) any of the populations of such CD8+ T-cells, or (iii) any of the pharmaceutical compositions comprising any such isolated CD8+ T-cell or comprising any such population of isolated CD8+ T-cells.

Any of a chemotherapeutic agent, a targeted therapy agent, an immunotherapeutic agent, or an anticancer agent may be for use in the manufacture of a medicament for treating, inhibiting, or suppressing a tumor or cancer in combination with any of the isolated CD8+ T-cell according to the invention (thus at least modified to (substantially) lack functional plexin-A2 and/or plexin-A4), any of the populations of such CD8+ T-cells, or any of the pharmaceutical compositions comprising any such isolated CD8+ T-cell or comprising any such population of isolated CD8+ T-cells.

Further medical uses include methods of treating, inhibiting, or suppressing a tumor or cancer in a subject having a tumor or cancer, said methods comprising the step of adoptive cell therapy of any of the isolated CD8+ T-cell according to the invention (thus at least modified to (substantially) lack functional plexin-A2 and/or plexin-A4), or of any of the populations of such CD8+ T-cells; or of administering (in particular: administering a therapeutically effective dose of) any of the isolated CD8+ T-cell according to the invention (thus at least modified to (substantially) lack functional plexin-A2 and/or plexin-A4), any of the populations of such CD8+ T-cells, or any of the pharmaceutical compositions comprising any such isolated CD8+ T-cell or comprising any such population of isolated CD8+ T-cells. Such methods may further comprise (simultaneous, separate or sequential) combination with administration of any of (i) surgery, (ii) radiation, (iii) chemotherapy, (iv) targeted therapy, (v) immunotherapy, or (vi) a further anticancer agent.

Further medical uses include methods of treating, inhibiting, or suppressing a tumor or cancer in a subject having a tumor or cancer, said methods comprising the step of administering (in particular: administering a therapeutically effective dose of) any of (i) surgery, (ii) radiation, (iii) chemotherapy, (iv) targeted therapy, (v) immunotherapy, or (vi) an anticancer agent, further in combination with adoptive cell therapy of any of the isolated CD8+ T-cell according to the invention (thus at least modified to (substantially)

lack functional plexin-A2 and/or plexin-A4), or of any of the populations of such CD8+ T-cells; or of administration (in particular: administering a therapeutically effective dose of) of any of the isolated CD8+ T-cell according to the invention (thus at least modified to (substantially) lack functional plexin-A2 and/or plexin-A4), any of the populations of such CD8+ T-cells, or any of the pharmaceutical compositions comprising any such isolated CD8+ T-cell or comprising any such population of isolated CD8+ T-cells.

Before moving to production methods and kits of the invention, some of terms as used in the medical use section are explained in more detail.

Adoptive Cell Transfer

In general, adoptive cell transfer (also known as cellular adoptive immunotherapy or T-cell transfer therapy) refers to the administration of ex-vivo expanded T cells to a subject in need of such adoptive cell transfer, wherein the original T cell is obtained from the subject prior to its expansion. The ex-vivo expanded T cells can, prior to their transfer back in the subject, be genetically modified. Well-known genetic modifications include genetic engineering such as to cause the T-cells to express antitumor T cell receptors (TCRs) or chimeric antigen receptors (CARs) to increase anti-tumor activity of the transferred T cells. In the context of the present invention, these well-known genetic modifications are not excluded and can be combined with genetic modifications aimed at forcing the T-cells to lack or to substantially lack functional plexin-A2 and/or plexin-A4 (as described above). In particular, in view of the experimental data presented herein, it is plausible that omission of plexin-A2 and/or plexin-A4 in T-cells employed in TCR-engineered or CAR-engineered adoptive T-cell transfer will further increase their anti-tumor activity. Thus, TCR-engineered T-cells, CAR-engineered T-cells, or CAR-T cells lacking or substantially lacking functional plexin A2 and/or functional plexin-A4 (as defined hereinabove) are part of the invention—in particular these T-cells are CD8+ T-cells. Pharmaceutical compositions comprising TCR-engineered T-cells, CAR-engineered T-cells, or CAR-T cells lacking or substantially lacking functional plexin A2 and/or functional plexin-A4 are also part of the invention. It can also be envisaged to take this a step further, i.e., to engineer the cells produced for adoptive cell transfer to express an inhibitor of Plexin-A2 and/or of Plexin-A4, or to load expanded cells with an inhibitor of Plexin-A2 and/or of Plexin-A4 prior to adoptive transfer.

Treatment/Therapeutically Effective Amount

"Treatment"/"treating" refers to any rate of reduction, delaying or retardation of the progress of the disease or disorder, or a single symptom thereof, compared to the progress or expected progress of the disease or disorder, or singe symptom thereof, when left untreated. This implies that a therapeutic modality on its own may not result in a complete or partial response (or may even not result in any response), but may, in particular when combined with other therapeutic modalities, contribute to a complete or partial response (e.g. by rendering the disease or disorder more sensitive to therapy). More desirable, the treatment results in no/zero progress of the disease or disorder, or singe symptom thereof (i.e. "inhibition" or "inhibition of progression"), or even in any rate of regression of the already developed disease or disorder, or singe symptom thereof. "Suppression/suppressing" can in this context be used as alternative for "treatment/treating". Treatment/treating also refers to achieving a significant amelioration of one or more clinical symptoms associated with a disease or disorder, or of any single symptom thereof. Depending on the situation, the significant amelioration may be scored quantitatively or qualitatively. Qualitative criteria may e.g. by patient well-being. In the case of quantitative evaluation, the significant amelioration is typically a 10% or more, a 20% or more, a 25% or more, a 30% or more, a 40% or more, a 50% or more, a 60% or more, a 70% or more, a 75% or more, a 80% or more, a 95% or more, or a 100% improvement over the situation prior to treatment. The timeframe over which the improvement is evaluated will depend on the type of criteria/disease observed and can be determined by the person skilled in the art.

A "therapeutically effective amount" refers to an amount of a therapeutic agent to treat or prevent a disease or disorder in a subject (such as a mammal). In the case of cancers, the therapeutically effective amount of the therapeutic agent may reduce the number of cancer cells; reduce the primary tumor size; inhibit (i.e., slow down to some extent and preferably stop) cancer cell infiltration into peripheral organs; inhibit (i.e., slow down to some extent and preferably stop) tumor metastasis; inhibit, to some extent, tumor growth; and/or relieve to some extent one or more of the symptoms associated with the disorder. To the extent the drug may prevent growth and/or kill existing cancer cells, it may be cytostatic and/or cytotoxic. For cancer therapy, efficacy in vivo can, e.g., be measured by assessing the duration of survival (e.g. overall survival), time to disease progression (TTP), response rates (e.g., complete response and partial response, stable disease), length of progression-free survival, duration of response, and/or quality of life.

The term "effective amount" refers to the dosing regimen of the agent (e.g. as described herein) or composition comprising the agent (e.g. medicament or pharmaceutical composition). The effective amount will generally depend on and/or will need adjustment to the mode of contacting or administration. The effective amount of the agent or composition comprising the agent is the amount required to obtain the desired clinical outcome or therapeutic effect without causing significant or unnecessary toxic effects (often expressed as maximum tolerable dose, MTD). To obtain or maintain the effective amount, the agent or composition comprising the agent may be administered as a single dose or in multiple doses. The effective amount may further vary depending on the severity of the condition that needs to be treated; this may depend on the overall health and physical condition of the subject or patient and usually the treating doctor's or physician's assessment will be required to establish what is the effective amount. The effective amount may further be obtained by a combination of different types of contacting or administration.

The aspects and embodiments described above in general may comprise the administration of one or more therapeutic compounds to a subject (such as a mammal) in need thereof, i.e., harboring a tumor, cancer or neoplasm in need of treatment. In general a (therapeutically) effective amount of (a) therapeutic compound(s) is administered to the mammal in need thereof in order to obtain the described clinical response(s).

"Administering" means any mode of contacting that results in interaction between an agent (e.g. a therapeutic compound) or composition comprising the agent (such as a medicament or pharmaceutical composition) and an object (e.g. cell, tissue, organ, body lumen) with which said agent or composition is contacted. The interaction between the agent or composition and the object can occur starting immediately or nearly immediately with the administration of the agent or composition, can occur over an extended time period (starting immediately or nearly immediately with the administration of the agent or composition), or can be delayed relative to the time of administration of the agent or composition. More specifically the "contacting" results in delivering an effective amount of the agent or composition comprising the agent to the object.

Anticancer Agent

The term anticancer agent is construed herein broadly as any agent which is useful or applicable in the treatment of a tumor or cancer in a subject. Anticancer agents comprise chemotherapeutic agents (usually small molecules) such as alkylating antineoplastic agents, anti-metabolites, anti-microtubule agents, topoisomerase inhibitors, and cytotoxic agents. The term further includes biological anticancer agents and immunotherapeutic drugs (such as immune checkpoint inhibitors) which are usually more specifically targeting the tumor or cancer (targeted therapy).

Chemotherapeutic agents may be one of the following compounds, or a derivative or analog thereof: doxorubicin and analogues [such as N-(5,5-diacetoxypent-1-yl)doxorubicin: Farquhar et al. 1998, J Med Chem 41:965-972; epirubicin (4'-epidoxorubicin), 4'-deoxydoxorubicin (esorubicin), 4'-iodo-4'-deoxydoxorubicin, and 4'-O-methyldoxorubicin: Arcamone et al. 1987, Cancer Treatment Rev 14:159-161 & Giuliani et al. 1980, Cancer Res 40:4682-4687; DOX-F-PYR (pyrrolidine analog of DOX), DOX-F-PIP (piperidine analog of DOX), DOX-F-MOR (morpholine analog of DOX), DOX-F-PAZ (N-methylpiperazine analog of DOX), DOX-F-HEX (hexamehtyleneimine analog of DOX), oxazolinodoxorubicin (3'deamino-3'-N, 4'-O-methylidenodoxorubicin, 0-DOX): Denel-Bobrowska et al. 2017, Life Sci 178:1-8)], daunorubicin (or daunomycin) and analogues thereof [such as idarubicin (4'-demethoxydaunorubicin): Arcamone et al. 1987, Cancer Treatment Rev 14:159-161; 4'-epidaunorubicin; analogues with a simplified core structure bound to the monosaccharide daunosamine, acosamine, or 4-amino-2,3,6-trideoxy-L-threo-hexopyranose: see compounds 8-13 in Fan et al. 2007, J Organic Chem 72:2917-2928], amrubicin, vinblastine, vincristine, calicheamicin, etoposide, etoposide phosphate, CC-1065 (Boger et al. 1995, Bioorg Med Chem 3:611-621), duocarmycins (such as duocarmycin A and duocarmycin SA; Boger et al. 1995, Proc Natl Acad Sci USA 92:3642-3649), the duocarmycin derivative KW-2189 (Kobayashi et al. 1994, Cancer Res 54:2404-2410), methotrexate, methopterin, aminopterin, dichloromethotrexate, docetaxel, paclitaxel, epithiolone, combretastatin, combretastatin A4 phosphate, dolastatin 10, dolastatin 10 analogues (such as auristatins, e.g. auristatin E, auristatin-PHE, monomethyl auristatin D, monomethyl auristatin E, monomethyl auristatin F; see e.g. Maderna et al. 2014, J Med Chem 57:10527-10534), dolastatin 11, dolastatin 15, topotecan, camptothecin, mitomycin C, porfiromycin, 5-fluorouracil, 6-mercaptopurine, fludarabine, tamoxifen, cytosine arabinoside, adenosine arabinoside, colchicine, halichondrin B, cisplatin, carboplatin, mitomycin C, bleomycin and analogues thereof (e.g. liblomycin, Takahashi et al. 1987, Cancer Treatment Rev 14:169-177), melphalan, chloroquine, cyclosporin A, and maytansine (and maytansinoids and analogues thereof such as analogues comprising a disulfide or thiol substituent: Widdison et al. 2006, J Med Chem 49:4392-4408; maytansin analogs DM1 and DM4). By derivative is intended a compound that results from reacting the named compound with another chemical moiety, and includes a pharmaceutically acceptable salt, acid, base, ester or ether of the named compound.

Other therapeutic agents or drugs include: vindesine, vinorelbine, 10-deacetyltaxol, 7-epi-taxol, baccatin III, 7-xylosyltaxol, isotaxel, ifosfamide, chloroaminophene, procarbazine, chlorambucil, thiophosphoramide, busulfan, dacarbazine (DTIC), geldanamycin, nitroso ureas, estramustine, BCNU, CCNU, fotemustine, streptonigrin, oxaliplatin, methotrexate, aminopterin, raltitrexed, gemcitabine, cladribine, clofarabine, pentostatin, hydroxyureas, irinotecan, topotecan, 9-dimethylaminomethyl-hydroxy-camptothecin hydrochloride, teniposide, amsacrine; mitoxantrone; L-canavanine, THP-adriamycin, idarubicin, rubidazone, pirarubicin, zorubicin, aclarubicin, epiadriamycin (4'epi-adriamycin or epirubicin), mitoxantrone, bleomycins, actinomycins including actinomycin D, streptozotocin, calicheamycin; L-asparaginase; hormones; pure inhibitors of aromatase; androgens, proteasome inhibitors; farnesyl-transferase inhibitors (FTI); epothilones; discodermolide; fostriecin; inhibitors of tyrosine kinases such as STI 571 (imatinib mesylate); receptor tyrosine kinase inhibitors such as erlotinib, sorafenib, vandetanib, canertinib, PKI 166, gefitinib, sunitinib, lapatinib, EKB-569; Bcr-Abl kinase inhibitors such as dasatinib, nilotinib, imatinib; aurora kinase inhibitors such as VX-680, CYC116, PHA-739358, SU-6668, JNJ-7706621, MLN8054, AZD-1152, PHA-680632; CDK inhibitors such as flavopirodol, seliciclib, E7070, BMS-387032; MEK inhibitors such as PD184352, U-0126; mTOR inhibitors such as CCI-779 or AP23573; kinesin spindle inhibitors such as ispinesib or MK-0731; RAF/MEK inhibitors such as Sorafenib, CHIR-265, PLX-4032, CI-1040, PD0325901 or ARRY-142886; bryostatin; L-779450; LY333531; endostatins; the HSP 90 binding agent geldanamycin, macrocyclic polyethers such as halichondrin B, eribulin, or an analogue or derivative of any thereof.

Monoclonal antibodies employed as anti-cancer agents include alemtuzumab (chronic lymphocytic leukemia), bevacizumab (colorectal cancer), cetuximab (colorectal cancer, head and neck cancer), denosumab (solid tumor's bony metastases), gemtuzumab (acute myelogenous leukemia), ipilumab (melanoma), ofatumumab (chronic lymphocytic leukemia), panitumumab (colorectal cancer), rituximab (Non-Hodgkin lymphoma), tositumomab (Non-Hodgkin lymphoma) and trastuzumab (breast cancer). Other antibodies include for instance abagovomab (ovarian cancer), adecatumumab (prostate and breast cancer), afutuzumab (lymphoma), amatuximab, apolizumab (hematological cancers), blinatumomab, cixutumumab (solid tumors), dacetuzumab (hematologic cancers), elotuzumab (multiple myeloma), farletuzumab (ovarian cancer), intetumumab (solid tumors), muatuzumab (colorectal, lung and stomach cancer), onartuzumab, parsatuzumab, pritumumab (brain cancer), tremelimumab, ublituximab, veltuzumab (non-Hodgkin's lymphoma), votumumab (colorectal tumors), zatuximab and anti-placental growth factor antibodies such as described in WO 2006/099698.

Immunotherapy is a promising new area of cancer therapeutics and several immunotherapies are being evaluated preclinically as well as in clinical trials and have demonstrated promising activity (Callahan et al. 2013, J Leukoc Biol 94:41-53; Page et al. 2014, Annu Rev Med 65:185-202). However, not all the patients are sensitive to immune checkpoint blockade and sometimes PD-1 or PD-L1 blocking antibodies accelerate tumor progression. To this purpose, combinatorial cancer treatments that include chemotherapies can achieve higher rates of disease control by impinging on distinct elements of tumor biology to obtain synergistic antitumor effects. It is now accepted that certain chemotherapies can increase tumor immunity by inducing immunogenic cell death and by promoting escape in cancer immunoediting. Immunotherapeutic agents include immune checkpoints antagonists including the cell surface protein cytotoxic T lymphocyte antigen-4 (CTLA-4) and programmed death-1 (PD-1) with their respective ligands. CTLA-4 binds to its co-receptor B7-1 (CD80) or B7-2 (CD86); PD-1 binds to its ligands PD-L1 (B7-H10) and PD-L2 (B7-DC).

Drug moieties known to induce immunogenic cell death include bleomycin, bortezomib, cyclophosphamide, doxorubicin, epirubicin, idarubicin, mafosfamide, mitoxantrone, oxaliplatin, and patupilone (Bezu et al. 2015, Front Immunol 6:187).

Production Methods

In a further aspect, the invention relates to methods of producing any of the isolated CD8+ T-cell according to the invention, such methods comprising the steps of obtaining CD8+ T-cells, and ex-vivo manipulation to cause the CD8+ T-cells to lack functional plexin-A2 and/or functional plexin-A4 by means of genetic modification, by means of pharmacological inhibition, or by means of pharmacological knock-down.

The invention further relates to methods of producing populations of any of the isolated CD8+ T-cells according to the invention, such methods comprising the steps of obtaining CD8+ T-cells, ex-vivo manipulation to cause the CD8+ T-cells to lack functional plexin-A2 and/or functional plexin-A4 by means of genetic modification, and ex-vivo expansion of the genetically modified CD8+ T-cells.

Alternative methods of producing populations of any of the isolated CD8+ T-cells according the invention, such methods comprising the steps of obtaining CD8+ T-cells ex-vivo expansion of the CD8+ T-cells, and ex-vivo manipulation to cause the CD8+ T-cells to lack functional plexin-A2 and/or functional plexin-A4 by means of pharmacological inhibition or by means of pharmacological knock-down.

In any of the above production methods, the CD8+ T-cells may be autologous cells obtained from a subject having a tumor or cancer, or, in particular, if required, from a tumor or from the tumor microenvironment from a subject having a tumor or cancer. Alternatively, the CD8+ T-cells are of allogenic origin.

Pharmaceutical Kits

A pharmaceutical kit refers in general to a packed pharmaceutical compound. Besides the one or more vials or containers comprising the pharmaceutical compound, such kits can comprise one or more vials of reconstitution fluid in case the pharmaceutical compound is provided as powder. A pharmaceutical kit in general also comprises a kit insert which, in case of an authorized medicine, itself also has been reviewed and approved by the health authorities (such as US FDA or EMEA). Thus, in a final aspect, the invention envisages pharmaceutical kits comprising as one component at least one of (i) any of the isolated CD8+ T-cells according to the invention, (ii) any of the populations of CD8+ T-cells according to the invention, (iii) any of the TCR-engineered T-cells, CAR-engineered T-cells, or CAR-T cells lacking or substantially lacking functional plexin A2 and/or functional plexin-A4, or (iv) any of the pharmaceutical compositions according to the invention. Such pharmaceutical kits can optionally further comprise one or more anticancer agents.

Tumor, Cancer, Neoplasm

The terms tumor (or tumour) and cancer are sometimes used interchangeably but can be distinguished from each other. A tumor refers to "a mass" which can be benign (more or less harmless) or malignant (cancerous). A cancer is a threatening type of tumor. A tumor is sometimes referred to as a neoplasm: an abnormal cell growth, usually faster compared to growth of normal cells. Benign tumors or neoplasms are nonmalignant/non-cancerous, are usually localized and usually do not spread/metastasize to other locations. Because of their size, they can affect neighboring organs and may therefore need removal and/or treatment. A cancer, malignant tumor or malignant neoplasm is cancerous in nature, can metastasize, and sometimes re-occurs at the site from which it was removed (relapse).

The initial site where a cancer starts to develop gives rise to the primary cancer. When cancer cells break away from the primary cancer ("seed"), they can move (via blood or lymph fluid) to another site even remote from the initial site. If the other site allows settlement and growth of these moving cancer cells, a new cancer, called secondary cancer, can emerge ("soil"). The process leading to secondary cancer is also termed metastasis, and secondary cancers are also termed metastases. For instance, liver cancer can arise as primary cancer, but can also be a secondary cancer originating from a primary breast cancer, bowel cancer or lung cancer; some types of cancer show an organ-specific pattern of metastasis.

Most cancer deaths are in fact caused by metastases, rather than by primary tumors (Chambers et al. 2002, Nature Rev Cancer 2:563-572).

EXAMPLES

Example 1. Materials and Methods

Animals

Plxna4 KO mice on a C57BL/6 background were obtained from Dr. Castellani (Institut NeuroMyoGene, Université de Lyon, France). C57BL/6 mice were purchased from Charles River. OT-I mice were purchased from Taconic. All mice were used between 6 and 12 weeks old, without specific gender selection. In all experiments, littermate controls were used. Housing and all experimental animal procedures were approved by the Institutional Animal Care and Research Advisory Committee of the KU Leuven.

Cell Lines

Murine Lewis lung carcinoma cells (LLC), B16-F10 melanoma cells, MC38 colon adenocarcinoma, and E0771 medullary breast adenocarcinoma (triple negative breast cancer, TNBC) cells were obtained from the American Type Culture Collection (ATCC). LLC-OVA and B16-F10-OVA cell lines were obtained by viral transduction with a pcDNA3-OVA plasmid. GL261-fluc glioma cells were a gift from U. Himmelreich (Biomedical MRI/MoSAIC, KU Leuven, Belgium). All cells were cultured in DMEM medium supplemented with 10% (heat-inactivated) Fetal Bovine Serum (FBS), 2 mM glutamine, 100 units/ml penicillin and 100 µg/ml streptomycin (All Gibco, Thermo Fisher Scientific) at 37° C. in a humidified atmosphere containing 5% $CO_2$.

Bone Marrow Transplantation

Six-week-old C56BL/6 recipient mice were lethally irradiated with 9.5 Gy. Subsequently, $1 \times 10^7$ bone marrow cells from the appropriate genotype were injected intravenously (IV) via tail vein. Tumor experiments were initiated 6 to 8 weeks after bone marrow reconstitution. Red and white blood cell count was determined using a hemocytometer on peripheral blood. Also, flow cytometry analysis was carried out in blood collected in heparin with capillary pipettes by retro-orbital bleeding.

Syngeneic tumor models Adherent growing murine cells, $1 \times 10^6$ LLC, $1 \times 10^6$ MC38 and $1 \times 10^5$ B16-F10 or B16-F10 OVA, were injected subcutaneously at the right side of the immunocompetent C57BL/6 mouse in a volume of 200 μl of PBS. Alternatively, 5×10⁵ E0771 medullary breast adenocarcinoma cell were injected orthotopically in the mammary fat pad of the second nipple on the right side in a volume of 50 μl of PBS. The E0771 model represents an immunologically "cold" breast cancer, and the immune infiltrate is dominated by immunosuppressive mo-MDSCs and M2-type TAMs. C57BL/6 mice bearing syngeneic tumors were randomized into groups (n=5) for treatment when tumor volumes reached 80 mm³. Tumor volumes were measured three times a week with a caliper and calculated using the formula: $V=\pi \times d^2 \times D/6$, where d is the minor tumor axis and D is the major tumor axis. At the end stage, tumors were weighted and collected for immunofluorescence and/or flow cytometric analyses.

Orthotopic Glioma Tumor Model

For intracranial orthotopic syngeneic glioma model, a total of 1×10⁵ GL261-fluc cells were stereotactically injected in the brain striatum (2 mm right, 0.5 mm back, and 3 mm deep from the bregma) of WT→WT and Plxna4 KO→WT mice chimeras 7 weeks after re-constitution. Animal body weight was evaluated 3 times per week, and general behavior and symptomatology daily. Tumor volume was measured by bioluminescent imaging (BLI) at day 15. Therefore, mice were anesthetized with isoflurane and placed in an IVIS® 100 system (Perkin Elmer) and 126 mg/Kg of D-luciferin (Promega) was injected intraperitoneally (IP). Images were acquired 20 minutes after the injection and analyzed for maximum intensity of the photon flux by the living Image® 2.50.1 software (Perkin Elmer). Tumor volume was also addressed near to the end point by Magnetic Resonance Imaging (MRI) in a preclinical MR scanner (Bruker Biospec 94/20). At sacrifice, mice were perfused with saline followed by 2% paraformaldehyde (PFA) and brains were collected for immunofluorescence analyses, for which samples were fixed by immersion in 2% PFA and subsequently embedded in paraffin.

CD8-Specific PlexinA2 Knockout Mice and Tumor Models

Conditional PlexinA2 (lox/lox) KO mouse line was intercrossed with CD8 specific CD8.CreERT2 mice (constitutive active Cre recombinase), for the specific deletion of PlxnA2 in CD8+ T cells. Adherent growing 1×10^6 MC38 colon adenocarcinoma cells were injected subcutaneously at the right side of the mouse in a volume of 200 μl of PBS. Tumor volumes were measured three times a week with a caliper and calculated using the formula: $V=p \times d2 \times D/6$, where d is the minor tumor axis and D is the major tumor axis. At the end stage, tumors were weighted. 5×10^5 E0771 medullary breast adenocarcinoma cells were injected orthotopically in the mammary fat pad of the second nipple on the right side in a volume of 50 μl of PBS. Tumor volumes were measured three times a week with a caliper and calculated using the formula: $V=p \times d2 \times D/6$, where d is the minor tumor axis and D is the major tumor axis. At the end stage, tumors were weighted and collected flow cytometric analyses.

Histology and Immunostainings

Tumors and lymph nodes (LNs) were collected and fixed in 2% PFA for 24 hours, washed in 70% ethanol and embedded in paraffin. Serial sections were cut at 7 μm thickness with HM 355S automatic microtome (Thermo Fisher Scientific). Paraffin slides were first rehydrated to further proceed with antigen retrieval in Target Retrieval Solution, Citrate pH 6.1 (DAKO, Agilent). If necessary, 0.3% hydrogen peroxide was added to methanol, to block endogenous peroxidases.

Alternatively, lymph nodes (LNs) were collected in OCT compound (Leica) and frozen at −80° C. After cryo-sectioning (7 μm thickness), samples were thawed and washed with PBS once, followed by fixation with 4% PFA, for 10 minutes at room temperature. After 3 washed, endogenous peroxidases activity was blocked by incubating the sections in methanol containing 0.3% hydrogen peroxide. The sections were blocked with the appropriate serum (DAKO, Agilent; or e.g., 5% FBS and 5% rat serum) and incubated overnight with the following antibodies: rat anti-F4/80 (CI:A3-1, Serotec) 1:100, rabbit anti-Hypoxyprobe-1-Mab1 (Hypoxyprobe kit, Chemicon) 1:100, rat anti-CD34 (RAM34, BD Biosciences) 1:100, rat anti-CD31 (MEC 13.3, BD Biosciences) 1:50, rabbit anti-NG2 (Millipore) 1:200, rat anti-CD8 (4SM16, Thermo Fisher Scientific) 1:100, rat anti-PNAd (MECA-79, Biolegend) 1:100, or Biotin anti-mouse/human PNAd (MECA-79, Biolegend) 1:100. Hoechst 33342 solution (Thermo Fisher Scientific, 1:1000) was used to stain nuclei. Appropriate secondary antibodies were used: Alexa 488, 647 or 568 conjugated secondary antibodies (Molecular Probes), biotin-labeled antibodies (Jackson Immunoresearch) and, when necessary, TSA Plus Cyanine 3 and Cyanine 5 System amplification (Perkin Elmer, Life Sciences) were performed according to the manufacturer's instructions. Whenever sections were stained in fluorescence, ProLong Gold mounting medium without DAPI (Invitrogen) was used. Microscopic analysis was done with an Olympus BX41 microscope and CellSense imaging software.

Hypoxia Assessment

Tumor hypoxia was detected by IP injection of 60 mg/kg pimonidazole hydrochloride into tumor-bearing mice 1 hour before the sacrifice. Mice were sacrificed and tumors were harvested. To detect the formation of pimonidazole adducts, tumor paraffin sections were immunostained with Hypoxyprobe-1-Mab1 (Hypoxyprobe kit, Chemicon) following the manufacturer's instructions.

Blood Vessel Perfusion and Leakiness

Perfused tumor vessels were counted on tumor sections from mice injected IV with 50 μL of 0.05 mg FITC-conjugated lectin (*Lycopersicon esculentum*; Vector Laboratories) 10 minutes before the sacrifice.

Tumors were collected in 2% PFA.

Flow Cytometry

Tumor-bearing mice were sacrificed by cervical dislocation, and tumors, tumor-draining and non-draining LNs were harvested. Tumors were minced in αMEM medium (Lonza), containing Collagenase V (Sigma), Collagenase D (Roche) and Dispase (Gibco), and incubated in the same solution for 30 minutes at 37° C. The digested tissue was filtered using a 70 μm pore sized mesh and cells were centrifuged 5 minutes at 300×g. LNs were processed on a 40 μm pore cell strainer in sterile PBS and cells were centrifuged for 10 minutes at 300×g. Blood samples were collected in heparin with capillary pipettes by retro-orbital bleeding. Red blood cell lysis was performed by using Hybri-Max™ (Sigma-Aldrich) or by using a home-made red blood cell lysis buffer (150 mM $NH_4Cl$, 0.1 mM EDTA, 10 mM $KHCO_3$, pH 7.4). Cells were resuspended in FACS buffer (PBS containing 2% FBS and 2 mM EDTA) and incubated for 15 minutes with Mouse BD Fc Block purified anti-mouse CD16/CD32 mAb (BD-Pharmingen) and stained for 30 minutes at 4° C. with: Fixable viability dye (eFluor™ 450 or eFluor™ 506, 1:500), anti-CD11b (M1/70, eFluor™ 506, 1:400), anti-F4/80 (BM8, Alexa Fluor® 488, 1:200), anti-CD8 (53-6.7, APC or APC-Cy7, 1:400; or Alexa Fluor™ 488, 1:100), anti-CD69 (H1.2F3, APC, 1:200), anti-IFN (XMG1.2, PE-Cy7 1:100), anti-Gata3 (TWAJ, eFluor 660, 1:50), anti-T-bet (4B10, PE-Cy7, 1:40), anti-FOXP3 (FJK-16s, PerCP-Cy5.5, 1:100) or anti-TCR VP5.1/5.2 (MR9-4, APC, 1:200)—from Thermo Fisher Scientific; anti-CD45 (30-F11, APC-Cy7, 1:300, or PerCP, 1:200), anti-CD115 (AFS98, PE-Cy7, 1:200), anti-CD4 (RM4-5, PerCP-Cy5.5 or APC-Cy7, 1:400), anti-granzyme B (GB11, Alexa Fluor® 647, 1:100)—from BioLegend; and anti-TCRβ (H57-597, BV421, 1:300) and anti-Ly-6G (1A8, PE, 1:500)—from BD Biosciences. Cells were subsequently washed and resuspended in FACS buffer before FACS analysis or flow sorting by a FACS Verse, FACS Canto II or FACS Aria III (BD Biosciences), respectively. Data was analyzed by FlowJo (TreeStar).

T Cell Isolation and Activation

Naïve T cells were isolated from spleen, inguinal and axillary LNs. In brief, tissues were processed on a 40 µm pore cell strainer in sterile PBS and cells were centrifuged for 10 minutes at 300×g. Red blood cell lysis was performed using Hybri-Max™ (Sigma-Aldrich). Total splenocytes were cultured in T cell medium—RPMI medium supplemented with 10% (heat-inactivated) Fetal Bovine Serum (FBS), 100 units/ml penicillin and 100 µg/ml streptomycin, 1% MEM Non-Essential Amino Acids (NEAA), 25 µm beta-mercaptoethanol and 1 mM Sodium Pyruvate (all Gibco, Thermo Fisher Scientific)—at 37° C. in a humidified atmosphere containing 5% $CO_2$. According to the experimental requirements, T cells were activated for 3 days by adding CD3/CD28 Dynabeads (Thermo Fisher Scientific) at a bead-to-cell ratio of 1:1 and 30 U/ml rIL-2 (PeproTech). At day 3 of activation, the beads were magnetically removed and activated T cells were further expanded for a maximum of 3 additional days in the presence of 30 U/ml rIL-2. To monitor cell proliferation, naïve T cells were labelled with 3.5 µM violet cell tracer (Thermo Fisher Scientific) at 37° C. for 20 minutes. The cells were subsequently washed with FACS buffer (PBS containing 2% FBS and 2 mM EDTA) and cultured according to the experimental requirements.

T Cell Migration Assay

Migration of $CD8^+$ cells was assessed by using transwell permeable supports with 5-µm polycarbonate membrane (Costar). $CD8^+$ cells were isolated by using MagniSort™ Mouse CD8 T cell negative selection kit (eBioscience) according to the manufacturer's instructions. To determine cell migration in response to soluble factors, the lower chamber was pre-incubated with 0.1% FBS, 200 ng/ml CCL21 and 200 ng/ml CCL19 (all Peprotech) in T cell medium. $CD8^+$ cells were incubated for 3 hours at 37° C. and migrated cells were collected and counted under the microscope. Alternatively, to determine cell migration in response to soluble factors, the lower chamber was pre-incubated with 0.1% FBS, 200 ng/ml CCL21, 200 ng/ml CCL19, 150 ng/ml CXCL9 and 50 ng/ml CXCL10 (all Peprotech) in T cell medium. $CD8^+$ T cells were incubated for 2 (activated) or 3 hours (naïve) at 37° C. and migrated cells in the bottom chamber were collected and counted by FACS using Precision Count Beads™ (Biolegend).

T Cell Homing Assay $CD8^+$ T cells were isolated from WT and Plxna4 KO mice and were labelled with either 3.5 µM violet cell tracer (Thermo Fisher Scientific) or 1 µM carboxyfluorescein succinimidyl ester (CFSE; Thermo Fisher Scientific). Healthy C57BL/6 mice were injected IV with a 1:1 mixture between 1-2×$10^6$ WT and KO T-cells. After 2 hours, lymph nodes (LNs) of the recipient mice were harvested. LNs were used for immunohistochemistry and flow cytometry to determine the percentage of WT and KO T-cells.

Tumor Homing Assay

Activated WT and Plxna4 KO OT-I T cells were labelled with either 3.5 µM of Violet Cell Tracer or 1 µM of CFSE and injected intravenously with a 1:1 mixture between 2-3×$10^6$ WT and Plxna4-deficient OT-I T cells into WT recipient mice with established B16-F10-OVA or LLC-OVA tumors. The tumors of recipient mice were harvested 24 and 48 hours after T cell transfer and analyzed by flow cytometry.

Adoptive Cell Transfer $CD8^+$ T cells were isolated from transgenic Plxna4 WT/KO OT-I mice, generated by the intercross of Plxna4 heterozygous mice with OT-I positive mice in the host lab. These mice have a monoclonal population of naïve TCR transgenic $CD8^+$ T cells (OT-I T cells) that recognize the immunodominant cytosolic chicken ovalbumin (OVA) "SIINFEKL" (SEQ ID NO:1) peptide. 1-2×$10^6$ WT and Plxna4 KO OT-I T cells were injected into WT recipient mice carrying subcutaneous LLC-OVA tumors (8×$10^5$ cells injected 5 days before T cell transfer).

Total splenocytes isolated from OT-1-PlexinA4 KO mice and littermate controls were activated with SIINFEKL (SEQ ID NO:1) peptide in the presence of IL-2. Six days later, $CD8^+$ T cells were inoculated intravenously (2.5×$10^6$ cells per mouse) into recipient mice carrying subcutaneous B16-OVA tumors (1×$10^5$ cells injected 13 days before T cell transfer). For activation of OT-I T cells, total splenocytes from OT-I mice were isolated and cultured for 3 days in T cell medium with 1 µg/ml SIINFEKL (SEQ ID NO:1) peptide (IBA-LifeSciences) and 30 U/ml rIL-2 (PeproTech). At day 3 of activation, OT-I T cells were further expanded for a maximum of 3 additional days in the presence of 30 U/ml rIL-2. Recipient mice were treated with cyclophosphamide (100 µmg/kg) 1 day before receiving effector $CD8^+$ T cells and received daily i.p. injections of 5 ug of recombinant human IL-2 beginning the day of adoptive transfer and lasting for 4 days.

WT recipient mice carrying orthotopic B16-F10-OVA tumors (average tumor size of 30-50 $mm^3$) were injected intravenously with either PBS, 2-3×$10^6$ WT or the same number of Plxna4 KO OT-I T cells. Recipient mice received daily intraperitoneal (IP) injections of 5 µg of recombinant human IL-2, beginning the day of adoptive transfer and lasting for 4 days. Tumor volume was measured at least 4 times per week and at the end of the experiment tumors were weighted and collected for flow cytometric analysis.

Quantitative RT-PCR

RNA was extracted from sorted tumor-associated macrophages and tumor-infiltrating T cells with TRizol (Life Technologies) according to the manufacturer's instructions. Reverse transcription to cDNA was performed with the SuperScript III First Strand cDNA Synthesis Kit (Life Technologies) according to the manufacturer's instructions. Pre-made assays were purchased from Applied Biosystem. cDNA, primer/probe mix and TaqMan Fast Universal PCR Master Mix were prepared in a volume of 10 µl according to manufacturer's instructions (Applied Biosystems). Samples were loaded into an optical 96-well Fast Thermal Cycling plate (Applied Biosystems) and qRT-PCR were performed using a QuantStudio 12K Flex Real-Time PCR System (Applied Biosystems). Samples were run in technical triplicates. Data was normalized to a housekeeping gene (HPRT) expression. The commercially available probes (Integrated DNA Technologies) used are listed in Table 1.

TABLE 1

List of probes used for gene expression analysis.

| Species | Gene | Exon location | Assay ID |
|---|---|---|---|
| Mouse | Hprt | Exon 2-3 | Mm.PT.58.32092191 |
| Mouse | PlxnA4 | Exon 2-3 | Mm.PT.58.8104978 |
| Human | Tbp | Exon 1-2 | Hs.PT.58v.39858774 |
| Human | PlxnA4 | Exon 29-30 | Hs.PT.58.4195119 |

GTPase Pull Down Assay

Rac1 activation was measured by using a Rac1 activation assay kit (Thermo Fisher Scientific) according to the manufacturer's instructions. Briefly, fresh lysates of activated WT and PlxnA4 KO T cells (day 5/6 of activation) were incubated with the glutathione S-transferase (GST)-fused p21-binding domain of Pak1 (GST-Pak1-PBD, 20 μg) bound to glutathione resin at 4° C. for 60 minutes with gentle rocking. After being washed three times with lysis buffer, the samples were eluted in 2×SDS reducing sample buffer, and analyzed for bound Rac1 (GTP-Rac1) by western blot.

Western Blotting

Protein concentration of cell extracts was determined by using Pierce™ bicinchoninic acid (BCA) reagent (Thermo Fisher Scientific) according to the manufacturer's instructions. Samples containing equivalent amounts of protein were subjected to 12% SDS-polyacrylamide gel electrophoresis. Proteins were transferred onto a nitrocellulose membrane using the Trans-Blot Turbo™ Transfer System (Bio-Rad) according to manufacturer's instructions. The membranes were blocked for non-specific binding in 5% non-fatty dry milk in Tris Buffered Saline-Tween 0.1% (50 mM Tris HCl ph 7.6, 150 mM NaCl, 0.1% Tween; TBS-T) for 1 hour at room temperature (RT) and incubated with primary antibody overnight (ON) at 4° C. The following antibodies were used: mouse anti-Rac1 (1:1000, Thermo Fisher Scientific). After incubation with the primary antibody, the membrane was washed for 15 minutes in TBS-T and incubated with the appropriate secondary antibody (1/5000 in 5% non-fatty dry milk in TBS-T) for 1 hours at RT. The following secondary antibodies were used: goat anti-mouse IgG-HRP (Santa Cruz biotechnology). The signal was visualized with Enhanced Chemiluminescent Reagents (ECL; Invitrogen) or SuperSignal™ West Femto Chemiluminescent Substrate (Thermo Fisher Scientific) with a digital imager (ImageQuant LAS 4000, GE Health Care Life Science Technologies). The results of the GTPase pull down assay were normalized against the corresponding band of the total proteins and quantified by densitometry.

Statistics

Data entry and all analyses were performed in a blinded fashion. All statistical analyses were performed using GraphPad Prism software on mean values, calculated from the averages of technical replicates. Statistical significance was calculated by two-tailed unpaired t-test (or paired t-test in the case of in vivo homing assay) on two experimental conditions or two-way ANOVA when repeated measures were compared, with $p<0.05$ considered statistically significant. Survival curves were compared with the log-rank (Mantel-Cox) test. Statistical details of the experiments can be found in the figure legends. Detection of mathematical outliers was performed using the Grubbs' test in GraphPad. Sample sizes for all experiments were chosen based on previous experiences. Independent experiments were pooled and analyzed together whenever possible. All graphs show mean values±SEM.

Example 2

Figure 1B:
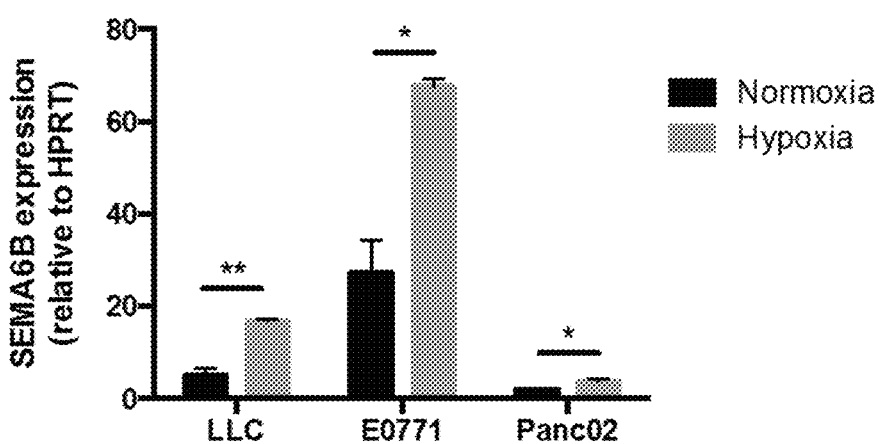
Figure 1C:
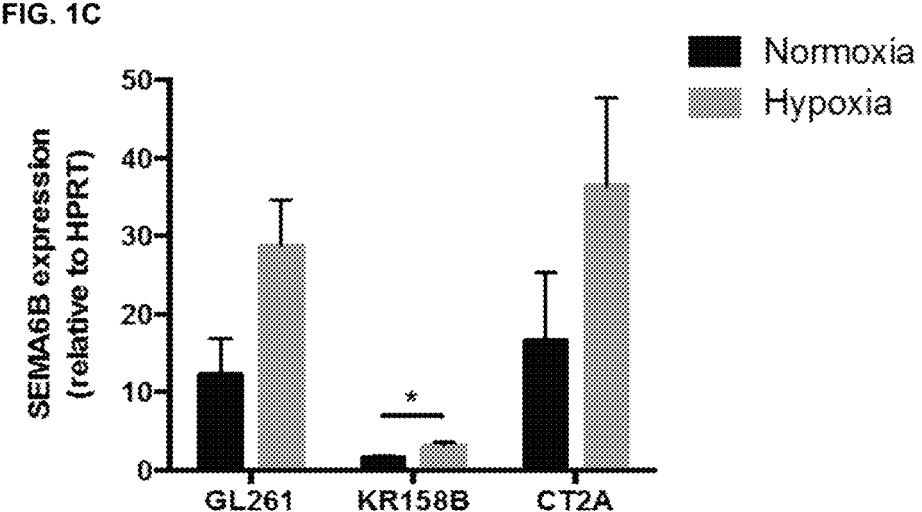

2.1. Under Hypoxia Sema6B is Upregulated in Tumor-Associated Macrophages (TAMs) and in Tumor Cells To analyse which chemoattractant/repulsive factors are implicated in the tumor microenvironment under hypoxia, transcriptional analysis was done in sorted TAMs from LLC tumors growing in wild-type mice and cultured under hypoxic and normoxic conditions. Sema6B was found to be specifically upregulated in TAMs cultured under hypoxic conditions (FIG. 1A). Previous studies showed that Sema3A was found to be strongly upregulated in cancer cells (reported in Casazza et al. 2013). In distinct tumor cell lines derived from solid tumors and GBM were grown under hypoxic conditions, also Sema6B was found to be specifically upregulated by hypoxia relative to normoxic conditions. (FIG. 1B). This indicates that hypoxic conditions of the tumor microenvironment might upregulate Sema6B in multiple cell types.

Class-6 semaphorins are single pass membrane bound semaphorins that were initially found to function as axon guidance factors, but that have recently been shown to be involved in other biological processes, including immune regulation. Plexin A4 (PlxA4) and PlexinA2 (PlxA2) transmembrane receptors both function as receptors for transmembrane class 6 semaphorins, as well as for secreted Sema3A in conjunction with Neuropilins as co-receptors. PlxnA4 appears to play a role in the regulation of the immune system in inflammation (Wen et al. 2010, J Exp Med 207:2943-2957; Yamamoto et al. 2008, Int Immunol 20, 413-420), but a role in immune-oncology is thus far unknown.

2.2. Plxna4 Expression is Dynamically Regulated in $CD8^+$ T Lymphocytes

Figure 8A:
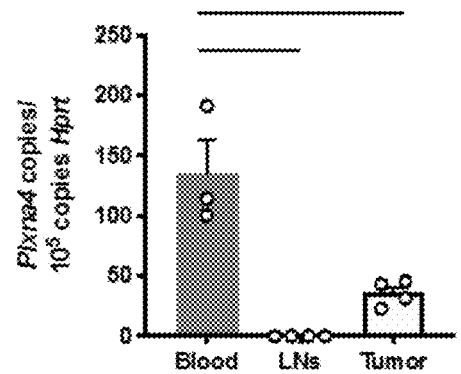
FIGS. 8A-8D. PlxnA4 expression is dynamically regulated in $CD8^+$ T lymphocytes.
Figure 8B:
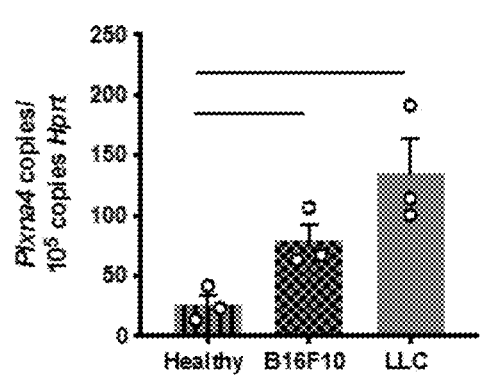
Figure 8C:
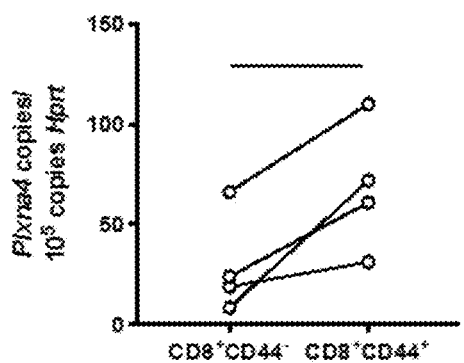
Figure 8D:
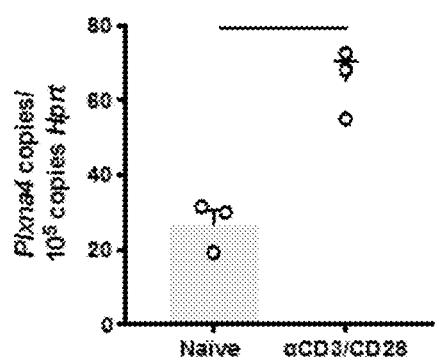

Cytotoxic T lymphocytes (CTLs) are among the most powerful anti-tumor cells in the immune system, and their infiltration level in the tumor microenvironment (TME) is correlated with good prognosis in several tumor types (for a review, e.g. Fridman et al. 2012, Nat Rev Cancer 12:298-306). PlxnA4 was described to play a role in the regulation of the immune system in sepsis (Wen et al. 2010, J Exp Med 207:2943-2957), and it seems to be a negative regulator of T-cell mediated immune responses (Yamamoto et al. 2008, Int Immunol 20:413-420). The role of PlxnA4 in CTLs in cancer context was studied as described herein. For that, we characterized the expression of Plxna4 in CTLs sorted from different organs of tumor-bearing mice. Plxna4 showed to be highly expressed in circulating CTLs, comparing to CTLs sorted from the lymph nodes (LNs) or the tumor bed (FIG. 8A). Interestingly, when we sorted circulating CTLs from healthy mice and compared their Plxna4 expression levels with their tumor-bearing counterparts, we found that Plxna4 is up-regulated in a tumor context (FIG. 8B), both in an orthotopic melanoma model (B16-F10 orthotopic injection) and in a subcutaneous lung model (based on LLC injection). These data suggested an involvement of PlxnA4 in CTL activation upon antigen presentation. Indeed, when comparing the expression of Plxna4 in antigen-experienced $CD8^+$ T cells ($CD44^+$) and their naïve counterparts (CD44-) in the circulation of tumor-bearing mice, we found that Plxna4 is up-regulated in antigen-experienced CTLs (FIG. 8C). Additionally, T-cell activation in vitro also showed to be sufficient for an induction of Plxna4 in spleen-derived CTLs (FIG. 8D). Taken together, these results suggest that Plxna4 expression becomes evident upon CTL activation but it is expressed at low levels in intratumoral CTLs.

Figure 9A:
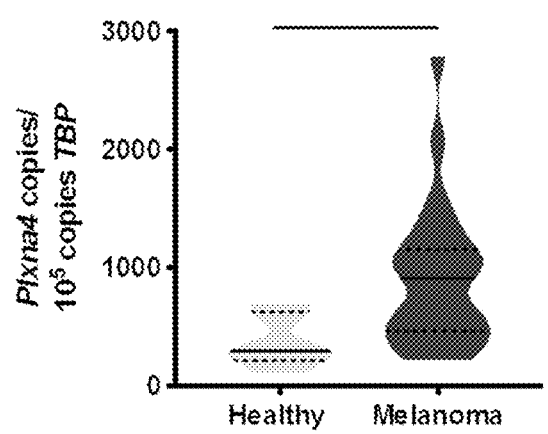
FIGS. 9A-9B. Plxna4 expression is upregulated in circulating $CD8^+$ T cells of melanoma patients.
Figure 9B:
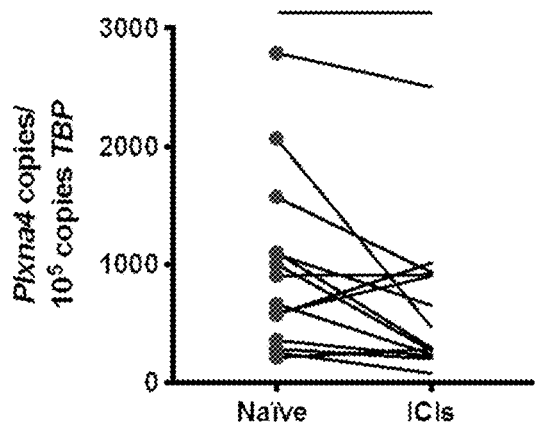

Furthermore, in an attempt to translate these findings to human cancer, a cohort of melanoma patients was used. Similar to what was observed in murine models, CD8+ T cells in circulation of melanoma patients expressed higher levels of Plxna4, compared to CTLs isolated from the blood of healthy volunteers (FIG. 9A). Furthermore, when analyzing the expression of Plxna4 in these patients after one cycle of immunotherapy, a significant decrease of this molecule in CTLs from treated patients was observed, compared to the same patients before treatment (FIG. 9B). Interestingly, immunotherapy frequently leads to an increase in the proliferation of the pre-existing CTLs (Kamphorst et al. 2017, Proc Natl Acad Sci USA 114:4993-4998), a feature related to the observed phenotype of Plxna4 KO CTLs. For this reason, these observations support the blocking of PlxnA4 as an additional checkpoint inhibitor with potential use in the clinic.

Example 3. Impaired Tumor Progression in Global PlxnA4 Knock-Out Mice

To assess the potential role of PlxnA4 in the stromal tumor microenvironment, the growth of distinct syngeneic tumor models was monitored in PlxnA4 knockout mice. Compared to wild-type (WT) controls mice, Plxna4 knockout (KO) mice (Yaron et al. 2005, Neuron 45:513-523) were phenotypically normal and had similar blood counts (Table 2; and Yamamoto et al. 2008, Int Immunol 20, 413-420). Subcutaneous LLC lung carcinomas and B16-F10 melanomas grew significantly slower in Plxna4 KO mice comparing to WT controls (FIGS. 2A-2D).

Figure 2A:
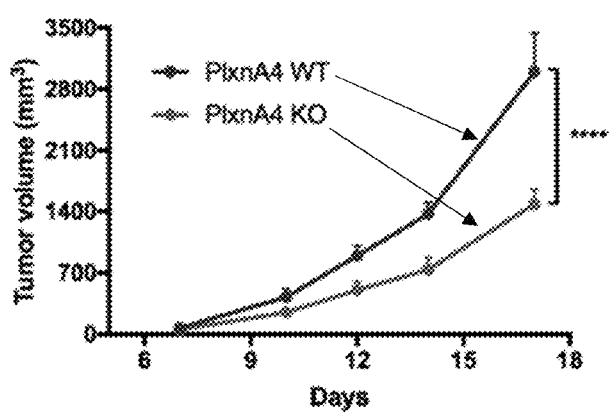
FIGS. 2A-2M. Loss of PlxnA4 in the stroma abates tumor growth without affecting TAMs phenotype and tumor vasculature.
Figure 2B:
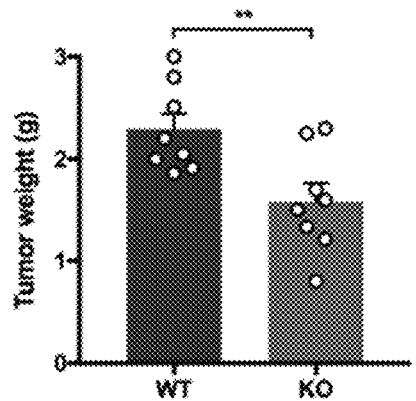
Figure 2C:
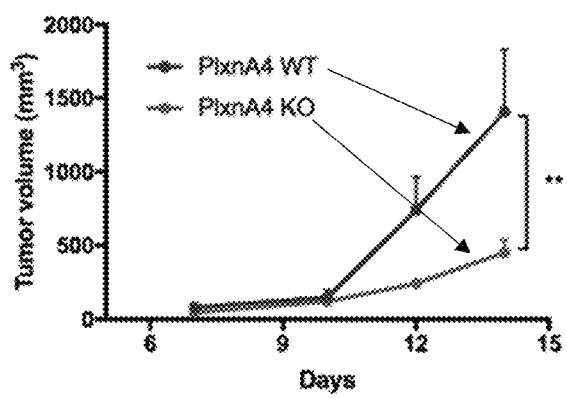
Figure 2D:
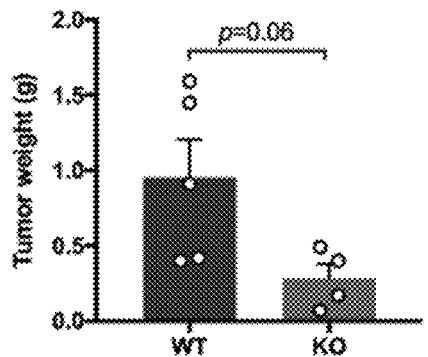
Figure 2E:
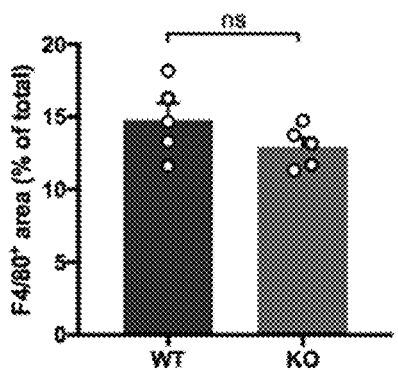
Figure 2F:
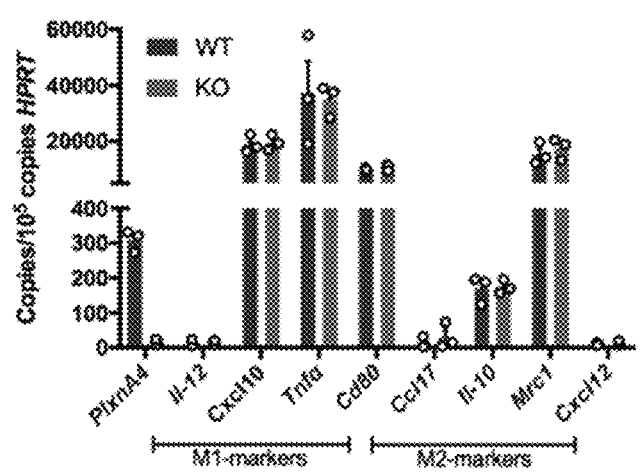
Figure 2G:
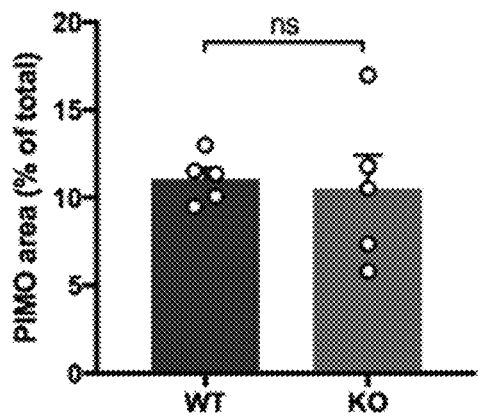
Figure 2H:
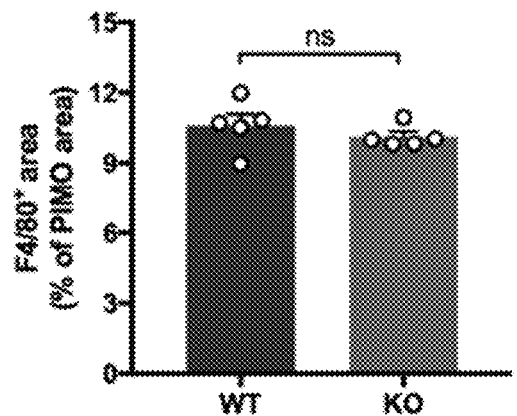
Figure 2I:
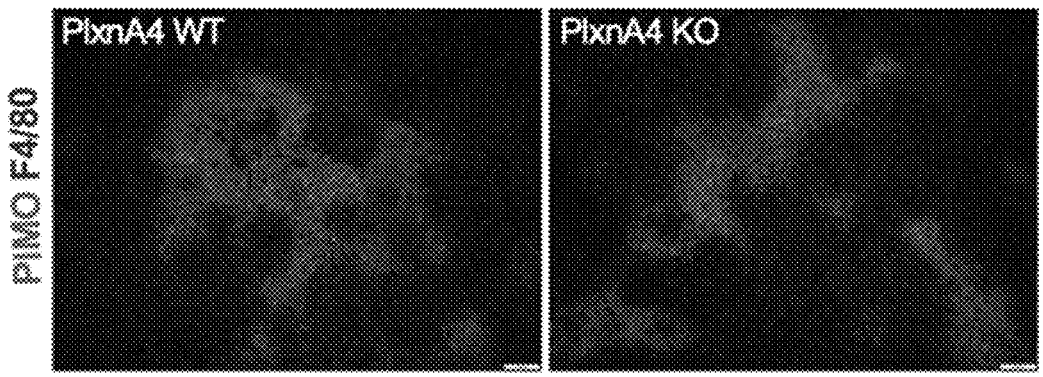

Because PlxnA4 was previously reported as part of the signaling cascade involved in the positioning of TAMs in the tumor, the impact of gene deletion on tumor macrophage infiltration (FIG. 2E), TAM phenotype (FIG. 2F), and localization within tumor niches (FIGS. 2H-2I) was assessed. Staining of tumor sections from WT and Plxna4 KO mice for the macrophage-specific marker F4/80 showed neither difference in TAM infiltration of the primary tumor (FIG. 2E), nor in their localization within hypoxic regions (FIGS. 2H-2I). Additionally, gene expression markers typically used to characterize classically (M1-like) and alternatively activated (M2-like) macrophages, were unaltered in sorted TAMs from WT and Plxna4 KO mice, suggesting that deletion of PlxnA4 does not affect macrophage polarization (FIG. 2F).

Figure 2J:
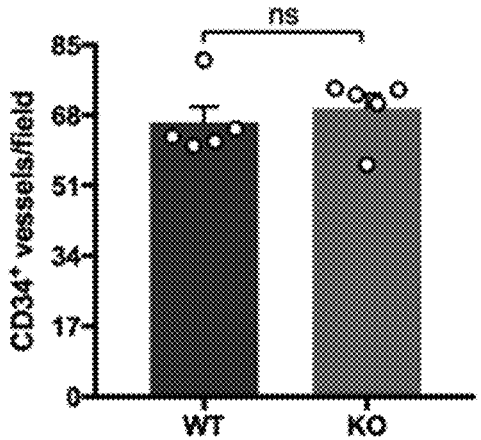
Figure 2K:
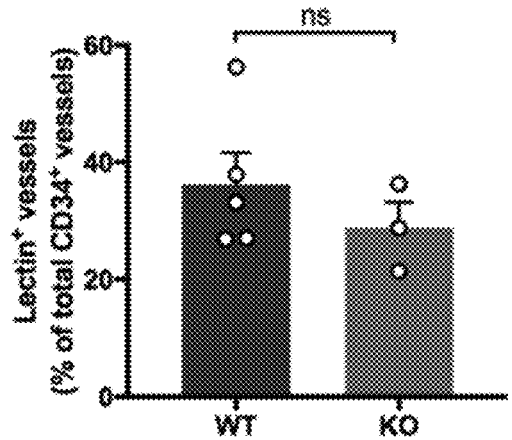
Figure 2L:
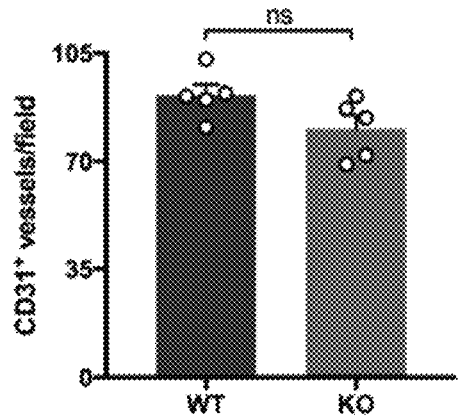
Figure 2M:
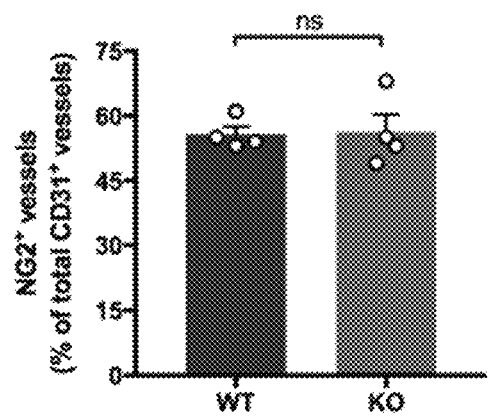

Previous observations suggest that PlxnA4 in human umbilical vein endothelial cells (HUVECs) may play a crucial role in bFGF-induced angiogenic sprouting of blood vessels (Kigel et al. 2011, Blood 118:4285-4296; WO2012114339A1). Hypoxic regions and blood vessel parameters were analyzed in WT and Plxna4 KO tumor-bearing mice. Tumor vessels were comparable between WT and Plxna4 KO mice with similar density (FIGS. 2J and 2L), vessel perfusion (FIG. 2K) and pericyte coverage (FIG. 2M), resulting in no differences in hypoxic areas (FIG. 2G).

In conclusion, loss of Plxna4 in the stroma reduces the tumor growth rate without affecting macrophage tumor infiltration, TAM phenotype, tumor vasculature nor the hypoxic areas.

TABLE 2

Hematological parameters in WT and Plxna4 KO mice.

| Cell Type | WT | Plxna4 KO | p-value |
|---|---|---|---|
| WBC (k/μL) | 3.63 ± 0.24 | 3.44 ± 0.25 | 0.59 |
| Neu (k/μL) | 0.21 ± 0.02 | 0.19 ± 0.02 | 0.64 |
| Lym (k/μL) | 3.23 ± 0.23 | 3.03 ± 0.24 | 0.54 |
| Mon (×10²/μL) | 0.67 ± 0.10 | 0.75 ± 0.13 | 0.65 |
| Eos (×10²/μL) | 0.81 ± 0.07 | 0.98 ± 0.10 | 0.17 |
| Bas (×10¹/μL) | 0.38 ± 0.13 | 0.15 ± 0.08 | 0.10 |
| RBC (M/μL) | 4.43 ± 0.05 | 4.46 ± 0.05 | 0.72 |

Data correspond to 20 mice per condition.
Abbreviations: WBC, white blood cells; Neu, neutrophils; Lym, lymphocytes; Mon, monocytes; Eos, eosinophils; Bas, basophils and RBC, red blood cells.
Data show mean ± SEM.

Figure 3A:
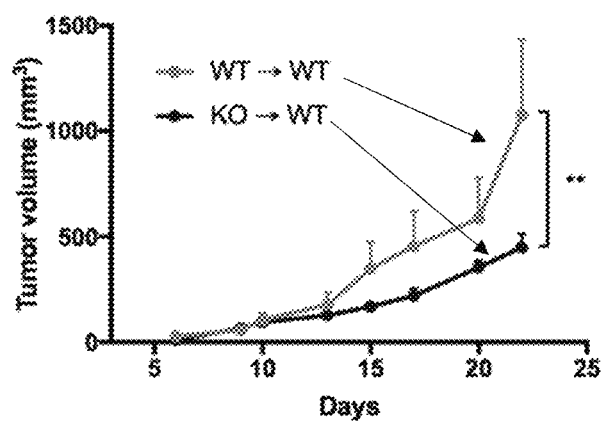
FIGS. 3A-3H. Deletion of PlxnA4 in the immune system reduces tumor growth in orthotopic models and increases CD8+ T-cell infiltration.
Figure 3B:
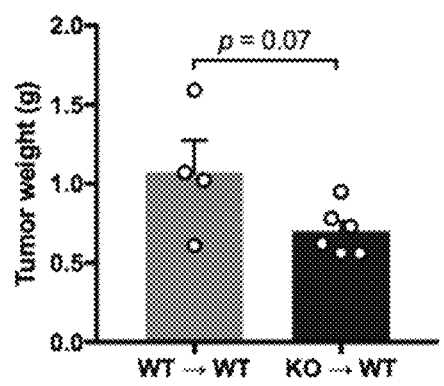
Figure 3C:
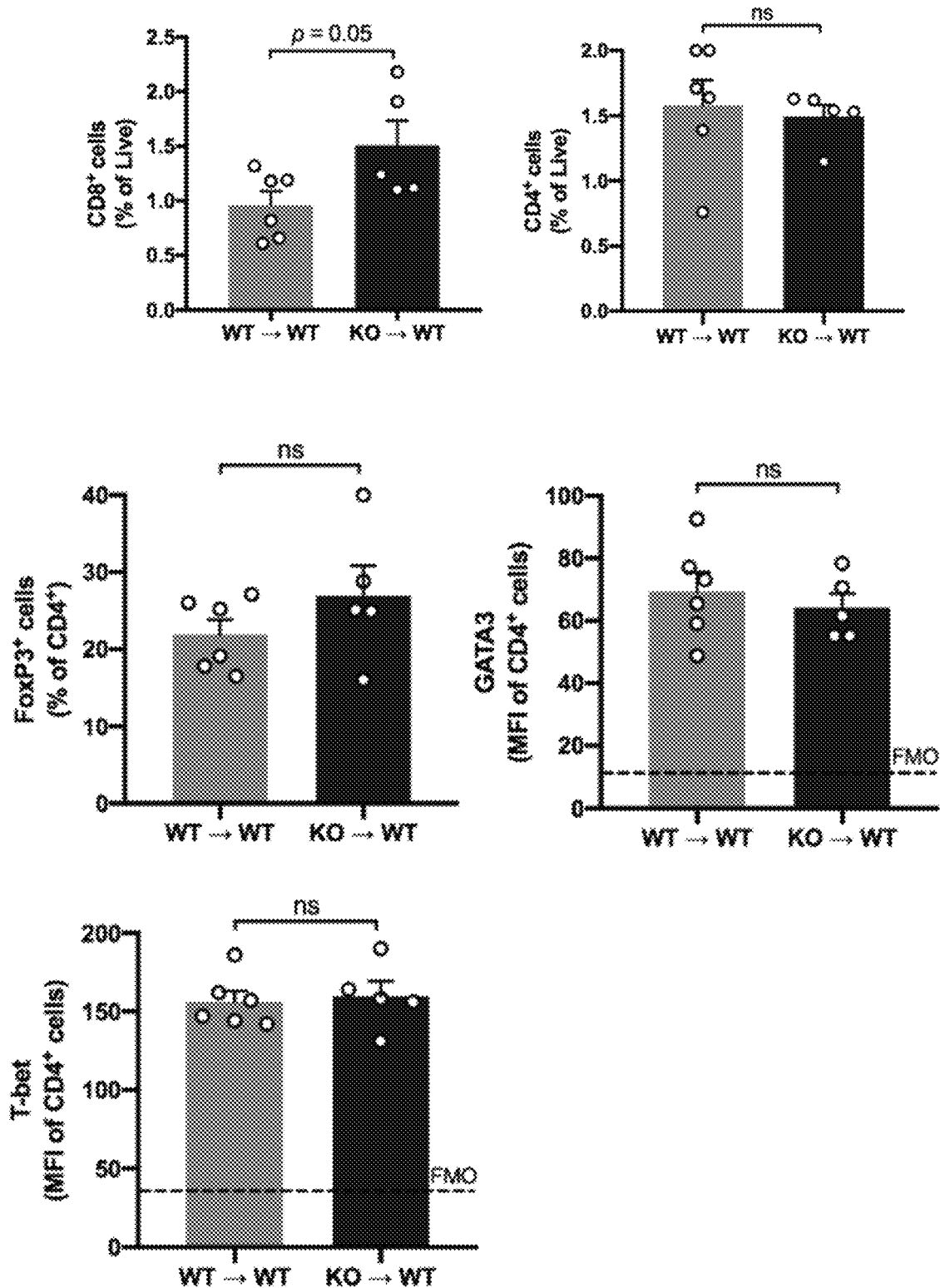

Example 4. Deletion of PlxnA4 Exclusively in the Immune System Reduces Orthotopic Tumor Growth and Increases Infiltration of CD8+ T-Cells in Tumors As a next step to decipher the role of PlxnA4 in the tumor stroma, a chimeric model was applied where PlxnA4 deletion is restricted to the immune system. Hereto bone marrow (BM) cells from WT or Plxna4 KO mice were transplanted into lethally irradiated recipient C57BL/6J mice, producing WT→WT or Plxna4 KO→WT mice, respectively. Upon reconstitution, Plxna4 KO→WT chimeras displayed normal blood counts and comparable to those of WT→WT mice (Table 32). As tumor microenvironment is reported to strongly influence tumor responses (e.g. Takahashi et al. 2018, Oncogene 37:2757-2772), it was evaluated how PlxnA4 loss in bone marrow-derived cells (BMDCs) affects the progression of orthotopic tumors. E0771 breast cancer cells were injected in the mammary fat pad of WT→WT or Plxna4 KO→WT mice. Consistent with the results observed for the Plxna4 KO mice, Plxna4 KO→WT mice showed reduced tumor growth comparing to their WT→WT counterparts (FIGS. 3A-3B). The immune infiltrate of E0771 tumors with the same tumor volume and weight was analyzed by flow cytometry. Tumors grown in Plxna4 KO→WT mice had increased infiltration of CD8+ cytotoxic T lymphocytes (CD8+ T-cells or CTLs), with no differences observed in CD4+ T helper cells, or specific CD4+ T cell subsets, including regulatory T cells (Tregs) (FIG. 3C).

Figure 3D:
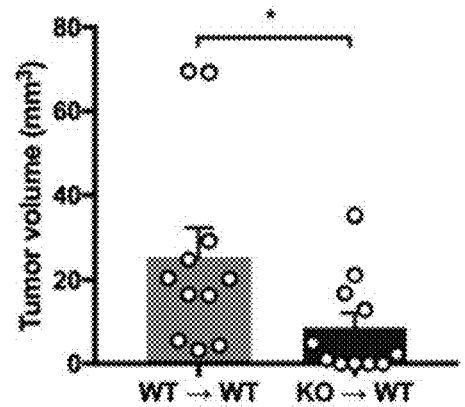
Figure 3E:
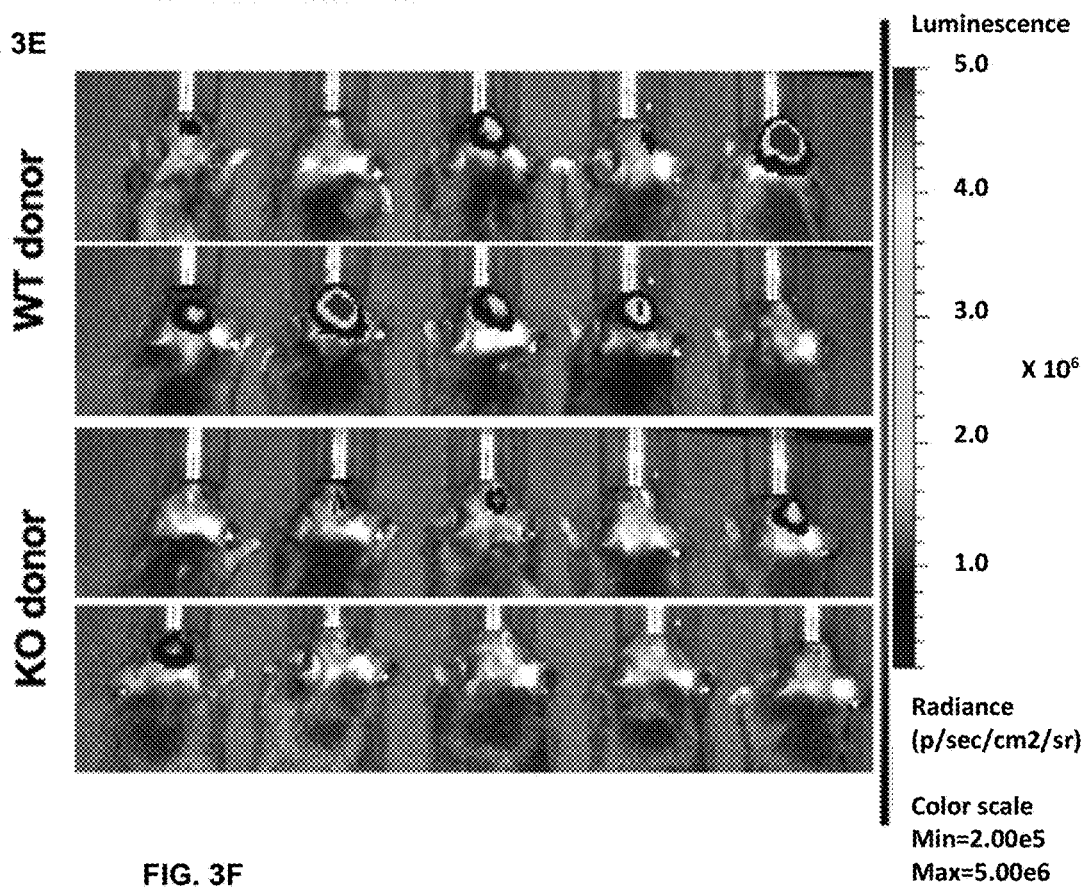
Figure 3F:
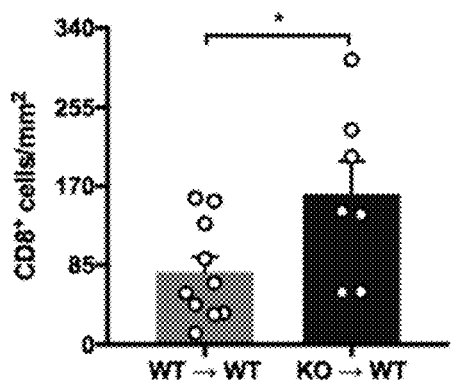

Because semaphorins are PlxnA4 ligands highly expressed in the brain, the effect of Plxn4 loss in an orthotopic immunological cold GL261 brain tumor model was analyzed. GL261 glioma cells were injected in the right striatum of the brain in WT→WT and Plxna4 KO→WT mice. Similar to what was observed for the orthotopic breast cancer model, tumors in the PlxnA4 KO chimeras grew significantly less comparing to the WT chimeras (FIGS. 3D-3E). Tumor sections where analyzed for CD8+ T cell infiltration, showing that tumors from Plxna4 KO→WT mice presented higher numbers of CD8+ T-cells comparing to the tumors grown in WT→WT chimeras (FIG. 3F).

Figure 3G:
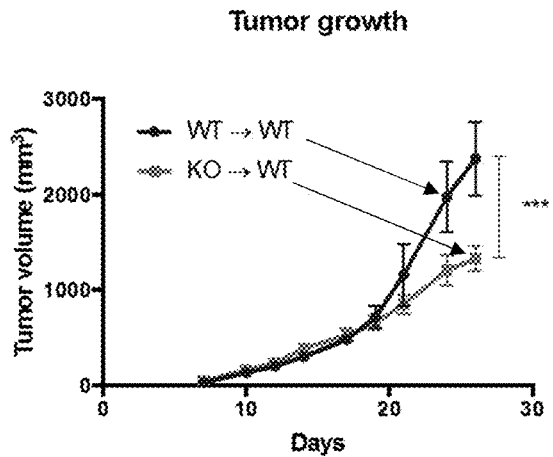
Figure 3H:
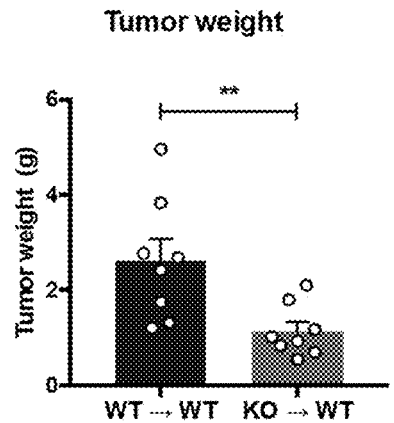

Finally, in a subcutaneous LLC lung cancer model the loss of PlxnA4 in bone marrow-derived cells showed reduced tumor growth significantly different from their WT→WT counterparts (FIGS. 3G-3H). Together, these data show that deletion of PlxnA4 in the immune system increases CD8+ T-cell infiltration in tumors and is accompanied by a slower progression of the tumor growth independently of the tissue origin.

TABLE 3

Hematological parameters in WT→WT or Plxna4 KO→WT mice.

| Cell Type | WT → WT | Plxna4 KO → WT | p-value |
|---|---|---|---|
| WBC (k/μL) | 9.42 ± 0.65 | 9.65 ± 0.84 | 0.83 |
| Neu (k/μL) | 0.40 ± 0.03 | 0.41 ± 0.06 | 0.87 |
| Lym (k/μL) | 8.48 ± 0.60 | 8.73 ± 0.75 | 0.80 |
| Mon (k/μL) | 0.11 ± 0.01 | 0.11 ± 0.02 | 0.98 |
| Eos (×10$^2$/μL) | 0.18 ± 0.02 | 0.22 ± 0.04 | 0.44 |
| Bas (k/μL) | 0.39 ± 0.03 | 0.32 ± 0.04 | 0.23 |
| RBC (M/μL) | 8.21 ± 0.74 | 9.23 ± 0.15 | 0.20 |

Data corresponds to 12 mice per condition.
Abbreviations: WBC, white blood cells; Neu, neutrophils; Lym, lymphocytes; Mon, monocytes; Eos, eosinophils; Bas, basophils and RBC, red blood cells.
Data show mean ± SEM.

Figure 4A:
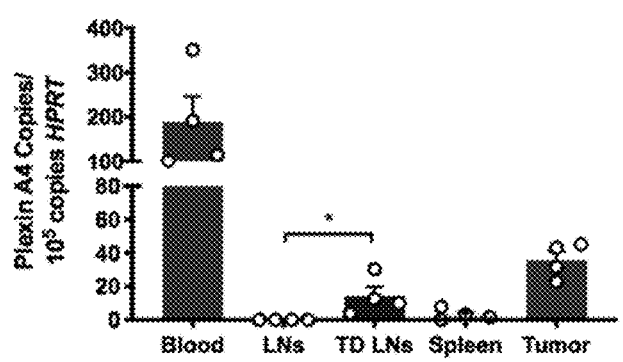
FIGS. 4A-4L. PlxnA4 loss in CD8+ T-cells increases their migratory capacity.
Figure 4B:
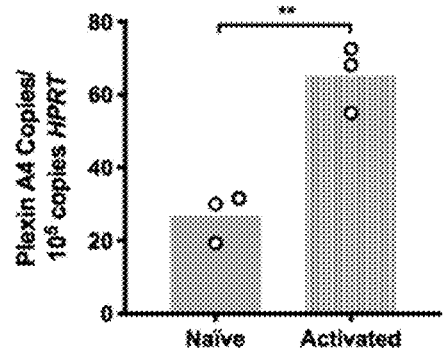

Example 5. PlxnA4 Deletion in CD8+ T-Cells Increases their Migratory and Proliferative Capacities Leading to a Stronger Anti-Tumor Response The expression of Plxna4 in CD8+ T-cells sorted from different organs from healthy and tumor-bearing mice was analyzed. In FIG. 4A is shown that Plxna4 is expressed in circulating CD8+ T-cells both in healthy and tumor-bearing mice, while its expression is significantly higher in the context of a tumor. No Plxna4 expression was detected in CD8+ T-cells from lymph nodes (LNs) and spleen in healthy mice (data not shown). In the context of a tumor, PlxnA4 expression was up-regulated in blood, tumor-draining LNs and in the TME (FIG. 4A). In vitro T-cell activation experiments showed a robust induction of Plxna4 expression in CD8+ T-cells after 4 days stimulation with CD3/CD28 (FIG. 4B). Together these data suggest an involvement of PlxnA4 in CD8+ T-cells activation in the LNs upon or during antigen presentation.

Figure 4C:
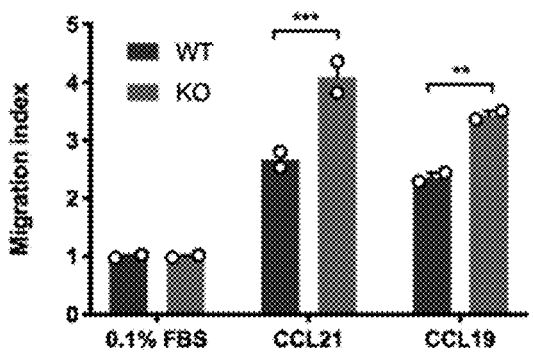
Figure 4D:
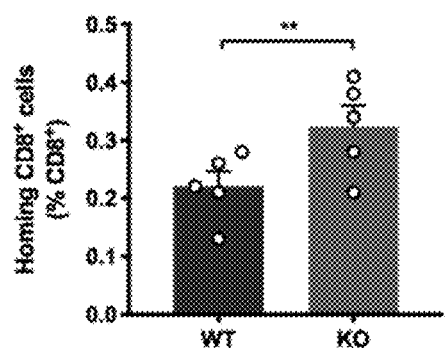
Figure 4E:
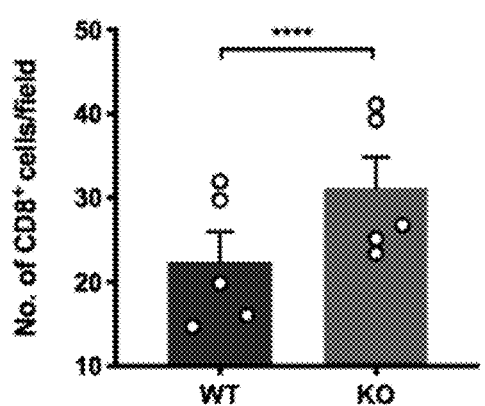

Since CD8+ T-cells expressed considerable levels of Plxna4 in the blood of tumor-bearing and healthy mice, a potential role in T cell motility was investigated in ex vivo chemotaxis assays using transwell plates. Migration of wild-type and PlxnA4 knockout CD8+ T-cells was assessed towards CCL21 and CCL19, chemokines involved in T cell homing to the LNs (Girard et al. 2012, Nat Rev Immunol 12:762-773), showing increased migration capacity of Plxna4-deficient CD8+ T-cells comparing to their WT counterparts (FIG. 4C). Moreover, Plxna4 KO CD8+ T-cells were more efficient in reaching the LNs upon transfer of WT and Plxna4 KO CD8+ T-cells into WT mice, as measured by entry into the LNs by flow cytometry and immunohistochemistry (FIGS. 4D-4E, and 4J).

Figure 4F:
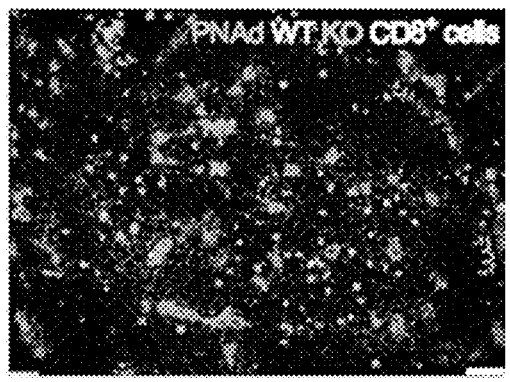

In terms of localization, both WT and Plxna4 KO CD8+ T-cells were able to enter the paracortical areas of the LNs with no entrapment in the high endothelial venules (HEVs, FIG. 4F).

Figure 4G:
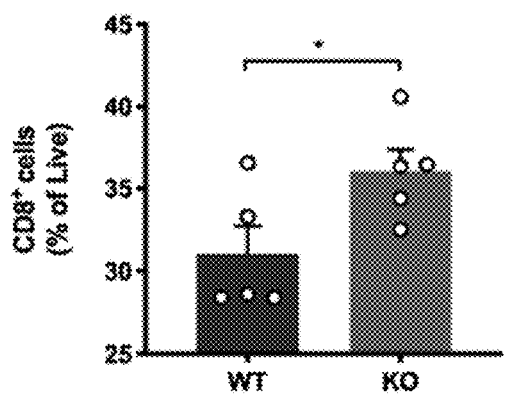
Figure 4H:
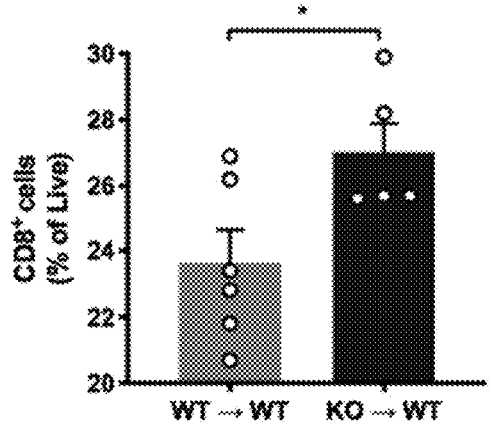

To analyse the migration capacity in tumor models, the total number of CD8+ T-cells in the LNs of mice bearing LLC subcutaneous tumors or E0771 orthotopic breast tumors was analyzed by flow cytometry of the tumor-draining LNs. Both Plxna4 KO mice and Plxna4 KO→WT chimeras showed increased numbers of CD8$^+$ T cells in the draining LNs comparing to WT mice and WT→WT chimeras, respectively (FIGS. 4G-4H).

Figure 4I:
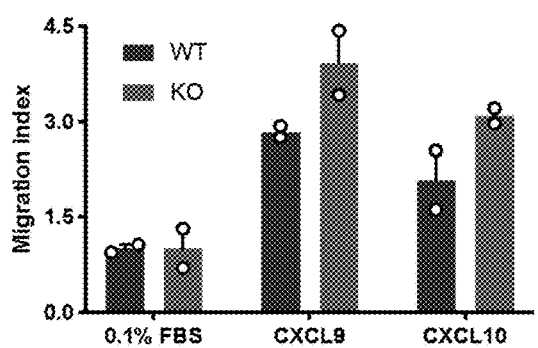
Figure 4J:
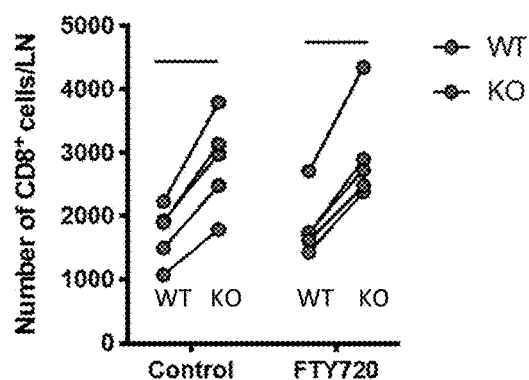

The migration capacity of PlexA4 KO CD8+ T-cells activated with CD3/CD28 was improved compared to activated WT CLTs in ex vivo chemotaxis assays towards CXCL9 and CXCL10, chemokines implicated in T cell recruitment to the TME (FIG. 4I).

In conclusion, PlxnA4 appears a negative regulator of CD8+ T-cell migration as loss of PlxnA4 in CD8$^+$ CD8+ T-cells was found to increase their migratory capacity towards the LNs, both in healthy and in tumor conditions.

Figure 4K:
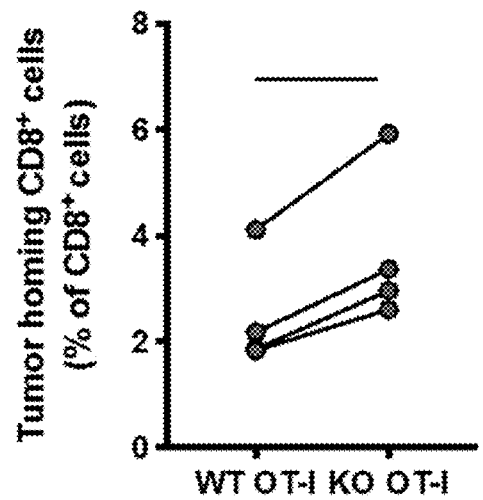
Figure 4L:
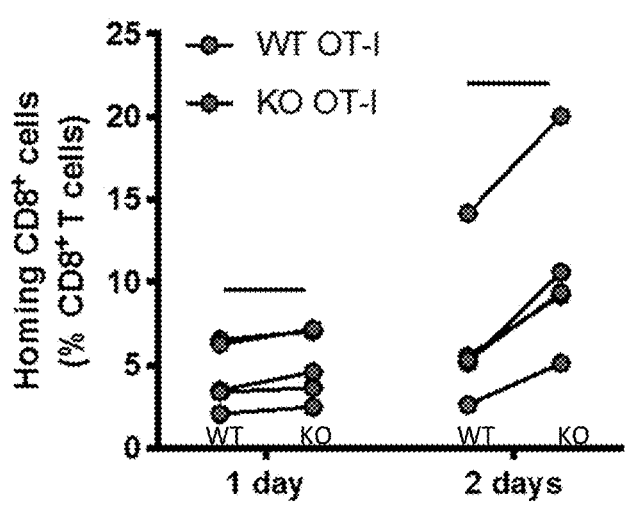

Furthermore, the homing ability to the tumor of Plxna4 KO CD8$^+$ T cells also showed to be increased in vivo, comparing to WT CD8$^+$ T cells, in a competition assay in mice bearing lung (FIG. 4K) and melanoma tumors (FIG. 4L).

Figure 5A:
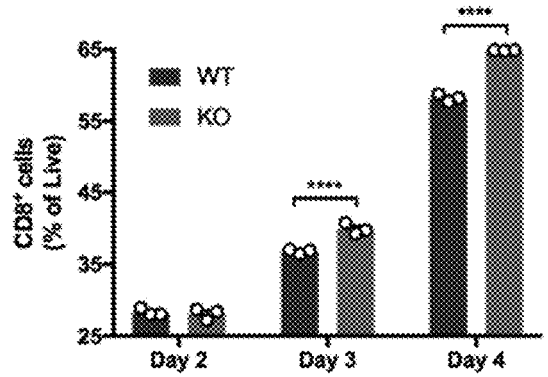
FIGS. 5A-5G. PlxnA4 KO CD8+ T-cells have increased proliferation index and present more effective anti-tumor responses.
Figure 5B:
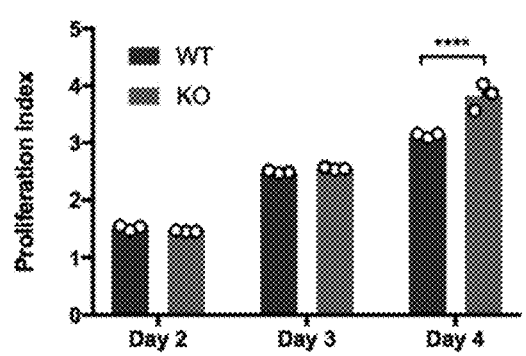
Figure 5C:
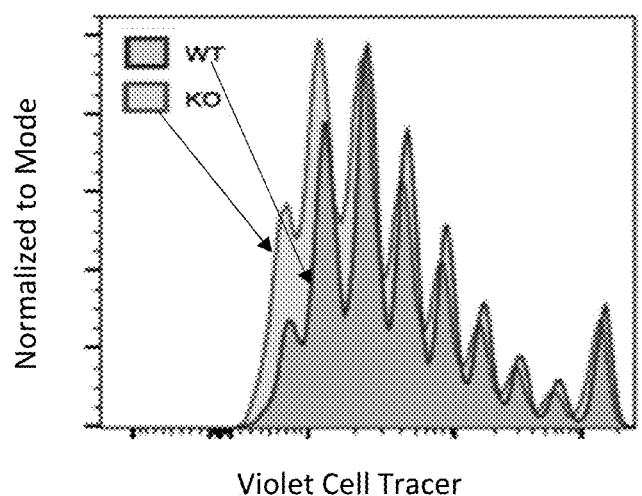
Figure 5D:
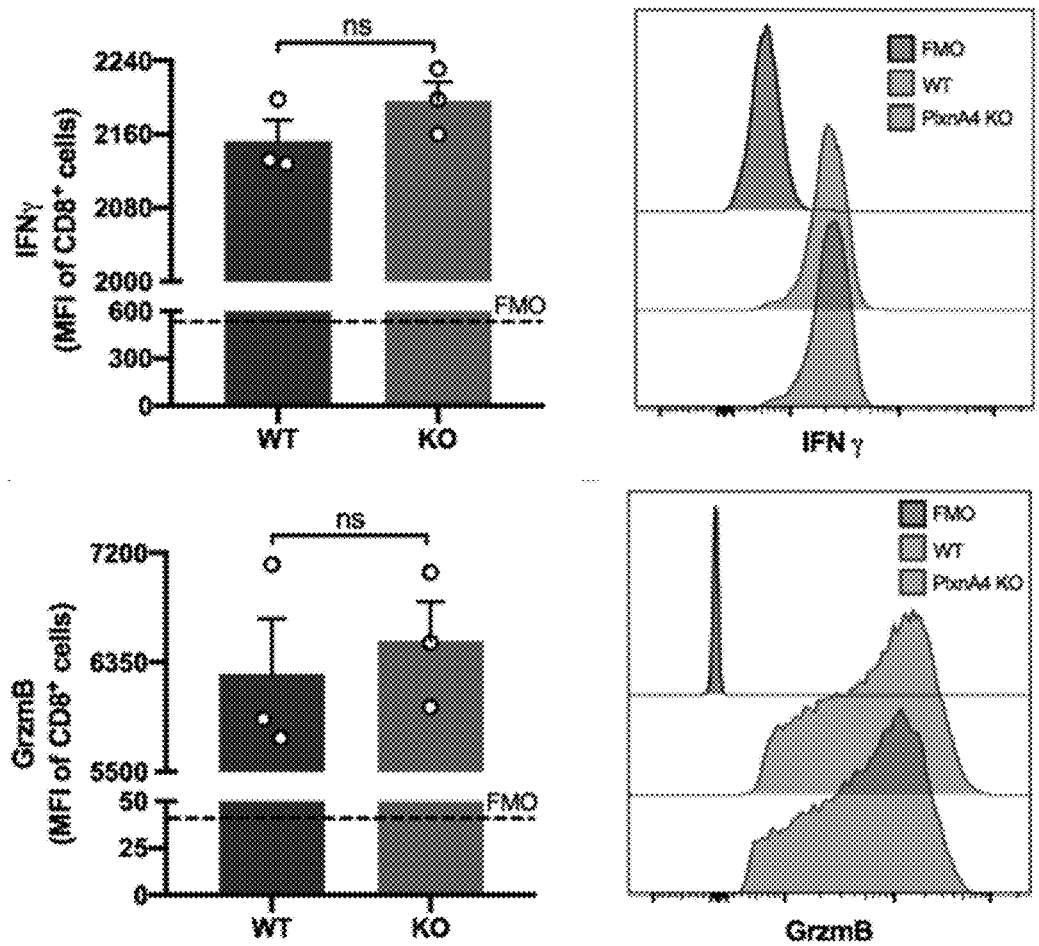

To assess whether the increased number of Plxna4 KO CD8+ T-cells in the tumors and in the LNs of tumor-bearing mice was a consequence of the increased migratory capacity of these cells, the in vitro proliferation of WT and Plxna4 KO splenocytes was analyzed in a time-course experiment. In the presence of primary and co-stimulatory signals (CD3/CD28 activation, respectively) optimized for efficient T-cell activation and expansion, the percentage of CD8$^+$ T cells in the total splenocytes increased over time for both WT and Plxna4 KO cultures, with. Plxna4 KO CD8+ T-cells showing increased enrichments as of day 3 (FIG. 5A). The proliferation index showed increased proliferation of Plxna4 KO CD8+ T-cells compared to WT controls at day 4 upon activation (FIGS. 5B-5C). This time-point correlates with the increased expression of Plxna4 in CD8+ T-cells upon activation (FIG. 4B), which may suggest a negative regulation of this protein in CD8+ T-cells proliferation.

Figure 5E:
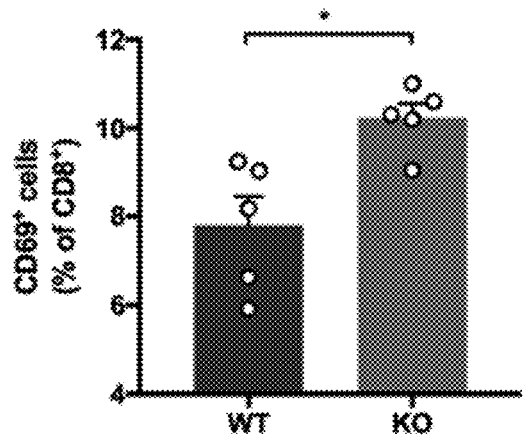
Figure 5F:
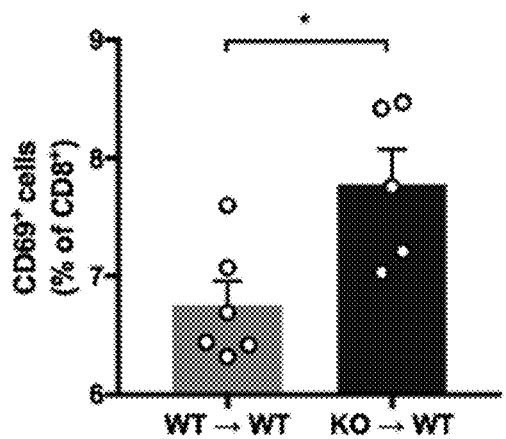
Figure 5G:
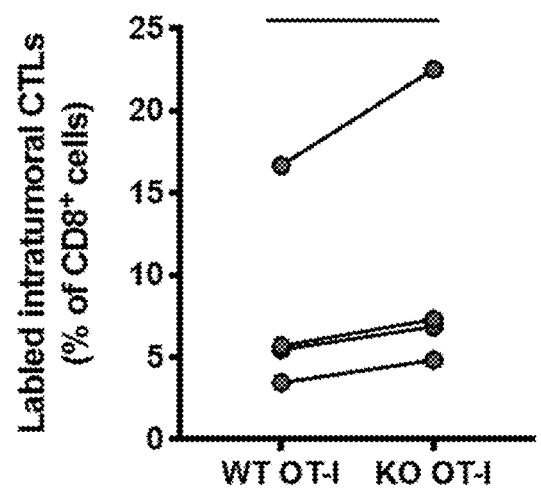

In vivo, the expression of the classical early marker of T-cell activation, CD69, showed to be upregulated in CD8+ T-cells in the LNs of KO tumor-bearing mice, compared to their respective WT controls (FIG. 5E). Furthermore, intratumoral injections of activated WT and Plxna4 KO CD8$^+$ T cells, revealed that Plxna4 KO CTLs proliferate significantly more in the tumor bed as compared to WT ones (FIG. 5G).

PlxnA4 has a cytoplasmatic region that contains a GTPase activating protein (GAP) domain, which mediates major intracellular signaling through the interaction with small GTPases (Kong et al. 2016, Neuron 91:548-560), and Rac1, a member of the small GTPases family, is necessary for the correct homing of the T cells to the LNs (Faroudi et al. 2010, Blood 116:5536-5547). The regulatory effect of PlxnA4 on the activation of small GTPases in CTLs was checked herein. For that, a GTPase pull down assay was performed to detect GTP-bound Rac1 in both WT and Plxna4 KO CTLs. Plxna4-deficient CD8$^+$ T cells had increased levels of active Rac1 (GTP-bound) when compared with the WT ones. Of note, the levels of GTP-bound Rap1 were indistinguishable between both conditions. Altogether, these data further support the idea that PlxnA4 has a role in controlling CTL motility, via the downstream activity of Rac1 small GTPase. Taken together, these results show that deletion of PlxnA4 in CD8+ T-cells increases their migratory capacity and induces a hyperproliferative response to TCR activation, without affecting their cytotoxicity in vitro. PlxnA4 KO CD8+ T-cells showed an increased activation status in the presence of an antigen, which is the case of draining LNs in tumor-bearing mice, suggesting that PlxnA4 is a negative regulator of CD8+ T-cells in the cancer context.

Example 6. PlxnA4-Deficient CD8+ T-Cells have Enhanced Anti-Tumor Efficacy

Figure 6A:
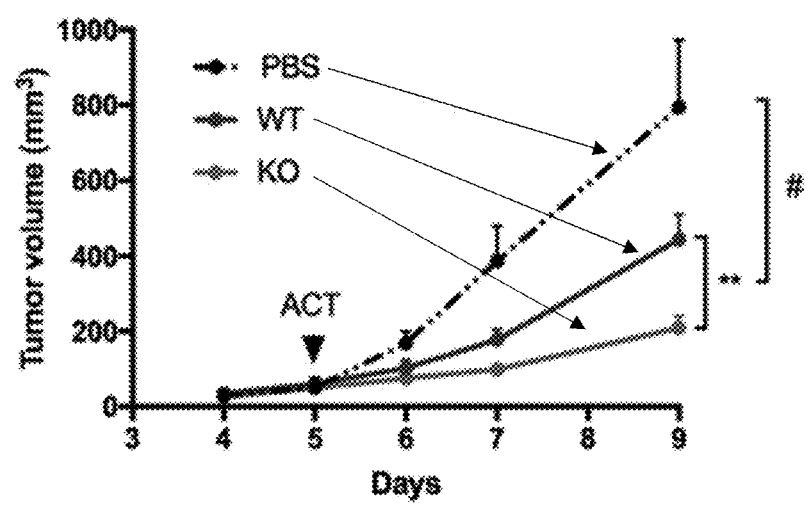
FIGS. 6A-6F. Adoptive T cell transfer (ACT) of WT and KO OT-I $CD8^+$ T cells in LLC-OVA or B16-F10-OVA tumor bearing mice.
Figure 6B:
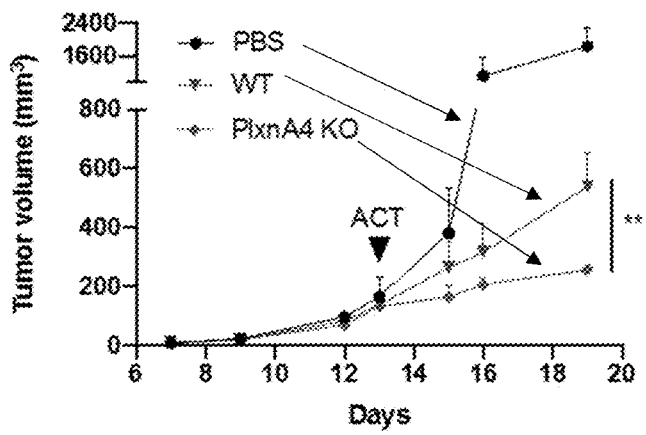
Figure 6C:
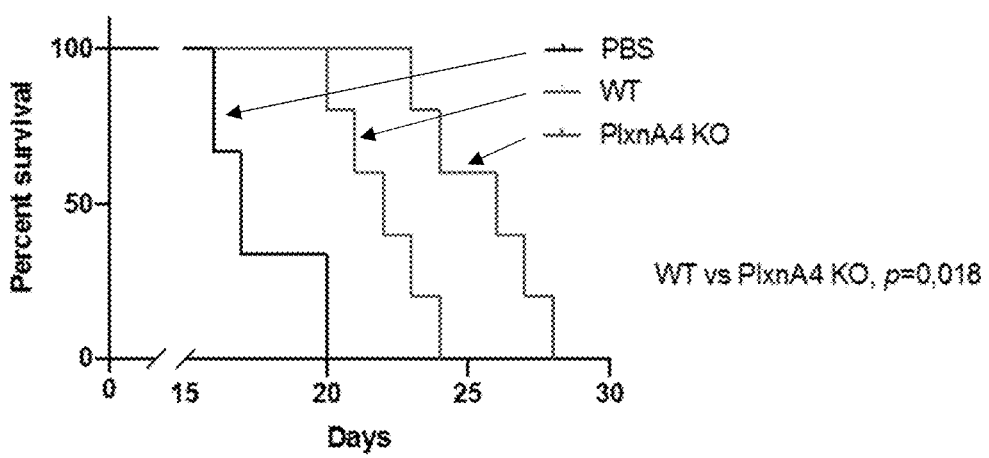
Figure 6D:
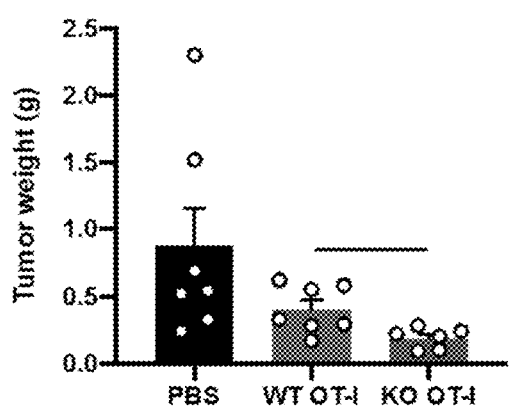
Figure 6E:
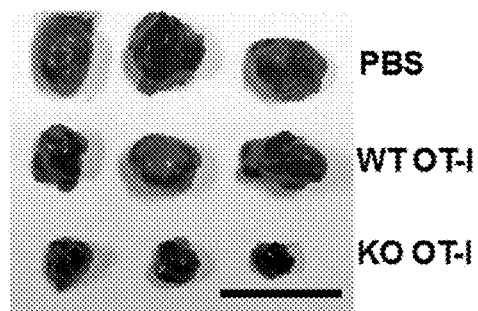

To evaluate the effect of deletion of PlxnA4 in CD8+ T-cells on the anti-tumor efficacy, the ability of Plxna4 deficient OT-1 CD8+ T-cells to control the tumor growth of LLC-OVA tumors was verified in an adoptive transfer regimen. Naïve Plxna4 KO OT-I CD8+ T-cells (CD8-positive T-cells expressing OT-1 and deficient in Plxna4), and the respective WT controls were transferred into LLC-OVA tumor-bearing WT recipient mice to monitor tumor progression. The transfer of Plxna4 KO OT-I CD8+ T-cells lead to a strong abrogation of the normal tumor growth, in comparison to the PBS group (FIG. 6A). Wild-type OT-I cells were also able to control tumor growth, but to a significantly lesser extent than the Plxna4 KO OT-I CD8+ T-cells (FIG. 6A). This shows the increased capacity of PlxnA4 KO CD8+ T-cells to migrate towards the LNs and reach the tumor.

Figure 6F:
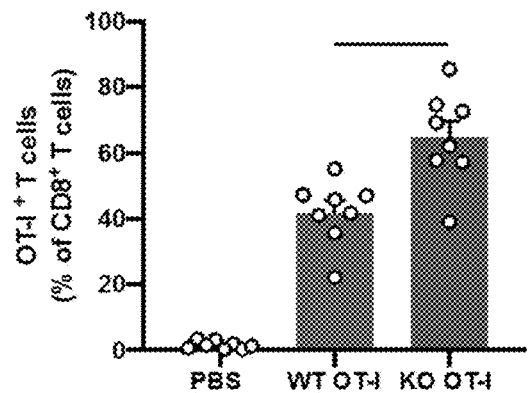

In a more therapeutic approach, activated PlxnA4 WT and KO OT-I T cells were adoptively transferred in B16-F10 melanoma tumor-bearing mice. In this setting, adoptive transfer of Plxna4 KO OT-I CD8+ T-cells likewise was able to control tumor growth to a significantly higher extent than wild-type OT-I CD8+ T-cells, resulting in an increased overall survival of the mice (FIGS. 6B-6E), and an increased number of intratumoral KO OT-I CD8+ T-cells (compared to the number of wild-type OT-I CD8+ T-cells) (FIG. 6F). Together these data show that the selective deletion of PlxnA4 in CD8+ T-cells is sufficient to increase anti-tumor immunity in two distinct tumor models, and that targeting PlxnA4 in CD8+ T-cells appears as a valuable strategy to manage several tumor types, including immunologically cold tumors.

Figure 7A:
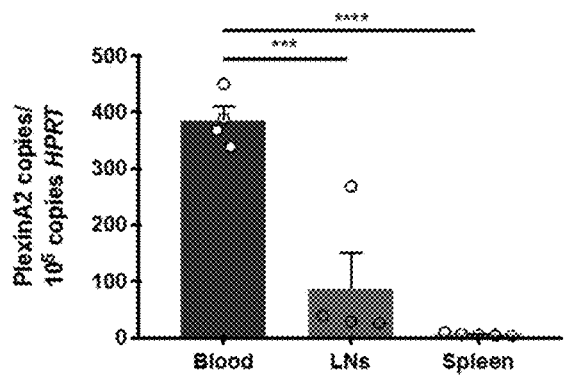
FIGS. 7A-7H. PlexinA2-specific deletion in CD8+ T cells increases anti-tumor immunity.
Figure 7B:
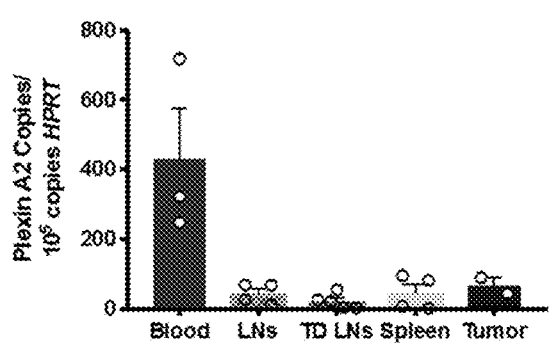

Example 7. Conditional PlxnA2 Deletion in CD8+ T-Cells Leads to Enhanced Infiltration of CD8+ T-Cells in Tumors and to Reduced Tumor Growth PlexinA2 shares the same ligands and signalling cascade as PlexinA4, and has been reported to be able to form heterodimers with PlexinA4. To assess a potential role of PlexinA2 on CD8+ T-cells in the tumor microenvironment, mRNA expression of plexinA2 was analysed after flow cytometric cell sorting of CD8+ T-cells derived from different tissues from either LLC-tumor bearing mice and healthy mice. Results shown in FIGS. 7A and 7B indicate that PlxnA2 is highly expressed in circulating CD8+ T cells in healthy and tumor-bearing mice.

Figure 7C:
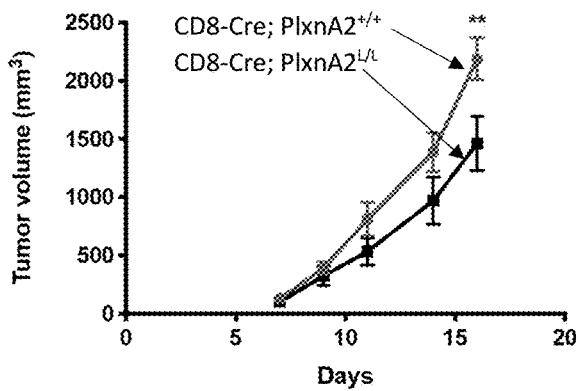
Figure 7D:
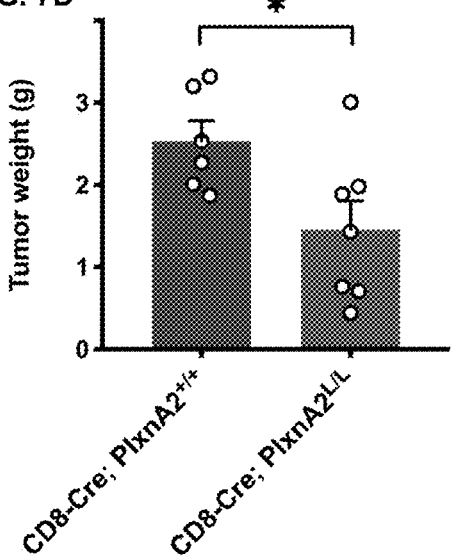
Figure 7E:
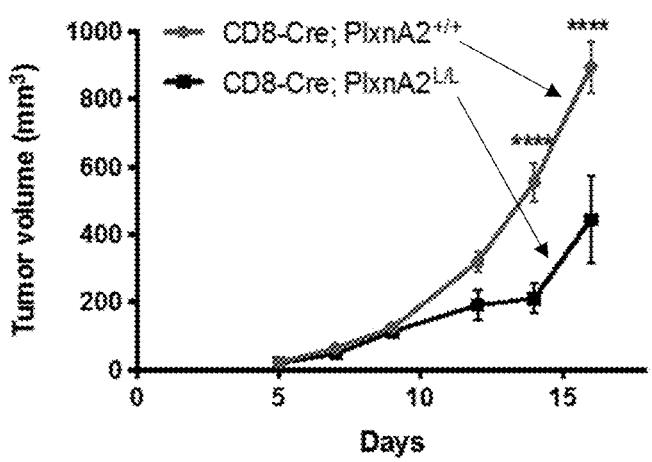
Figure 7F:
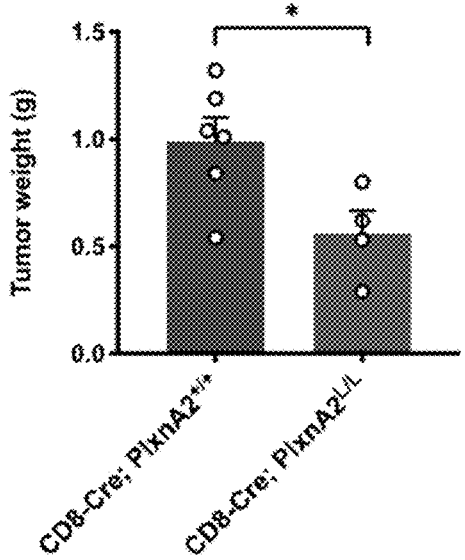
Figure 7G:
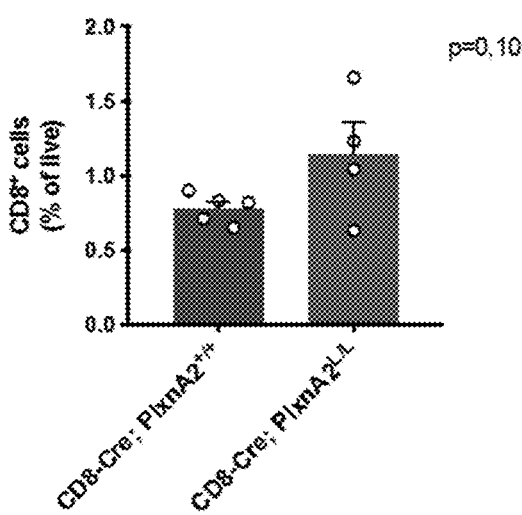
Figure 7H:
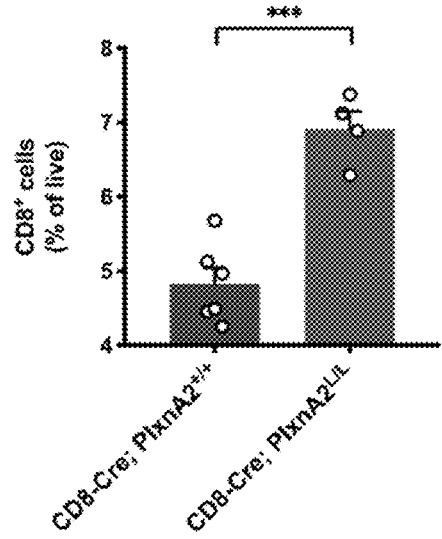

To directly decipher the functionality of Plxn2 expressed on CD8+ T cells in a cancer setting, a conditional knockout model was set-up using the Cre-lox system, PlexinA2 L/L CD8.Cre KO mouse model. Tumor growth was monitored in two distinct syngeneic tumor models, subcutaneous MC38 colon adenocarcinoma (FIGS. 7C, 7D) and orthotopic E0771 TNBC (FIGS. 7E, 7F). In both models the PlxnA2-specific deletion in CD8+ cells was found to reduce the tumor growth versus the wildtype control group. The analysis of tumor-infiltrating CD8+ T-cells was done by flow cytometry in orthotopic E0771 tumors grown until day 16. FIGS. 7G-7H shows the results. The PlxnA2-specific deletion in CD8+ T cells leads to a higher number of CD8+ T cells in blood and primary tumors compared to the WT controls.

In conclusion, the selective loss of PlxnA2 on CD8+ T-cells enhances their tumor infiltration and reduces the tumor growth.

The invention claimed is:

1. A composition comprising isolated CD8-positive (CD8+) T-cells,
   wherein the isolated CD8+ T-cells lack functional plexin A2 and/or functional plexin-A4; and
   wherein the isolated CD8+ T-cells have been expanded ex-vivo.

2. The composition of claim 1 wherein the lack of functional plexin-A2 and/or of functional plexin-A4 is due to ex-vivo manipulation of the CD8+ T-cell.

3. The composition of claim 1, wherein the lack of functional plexin-A2 and/or of functional plexin-A4 is due to genetic modification, pharmacological inhibition, and/or pharmacologic knock-down.

4. The composition of claim 3, wherein the pharmacological inhibition is by an agent inhibiting plexin-A2 and/or plexin-A4 or wherein the pharmacological knock-down is from an agent inducing degradation of plexin-A2 and/or plexin-A4.

5. The composition of claim 4, wherein the agent inhibiting plexin-A2 and/or plexin-A4 is an agent that specifically binds to plexin-A2 and/or plexin-A4.

6. The composition of claim 4, wherein the agent inhibiting plexin-A2 and/or plexin-A4 is a polypeptide, a polypeptidic agent, an aptamer, or a combination of any of the foregoing.

7. The composition of claim 3, wherein the genetic modification is genetic knock-out, genetic mutation, or genetic silencing of the plexin-A2 encoding gene and/or the plexin-A4 encoding gene.

8. The composition of claim 7 wherein the genetic modification results from homologous recombination, RNA interference, or a nuclease.

9. The composition of claim 3, wherein the genetic modification comprises the introduction into the isolated CD8+ T-cells of a genetic construct encoding an agent inhibiting plexin-A2 and/or plexin-A4.

10. The composition of claim 1, wherein the isolated CD8+ T-cells originate from a subject having a tumor or cancer.

11. The composition of claim 1 wherein the isolated CD8+ T-cells express an anti-tumor T-cell receptor or a chimeric antigen receptor.

12. The composition of claim 1, wherein the composition is a pharmaceutical composition.

13. The composition of claim 1, wherein the composition further comprises an anticancer agent.

14. A method of adoptive cell therapy or treating, inhibiting, or suppressing a tumor or cancer in a subject in need thereof, the method comprising: administering the composition of claim 1 to the subject.

15. The method according to claim 14, the method further comprising treating the subject with surgery, radiation, chemotherapy, targeted therapy, immunotherapy, or an anticancer agent.

16. A method of producing the composition of claim 1, the method comprising:
- obtaining CD8+ T-cells from a subject having a tumor or cancer, and
- manipulating the obtained CD8+ T-cells ex-vivo by genetic modification or pharmacological inhibition so as to obtain CD8+ T-cells lacking functional plexin-A2 and/or functional plexin-A4.

17. The method according to claim 16, the method further comprising ex-vivo expansion of the CD8+ T-cells.

18. The method according to claim 17, wherein the ex-vivo expansion of the CD8+ T-cells occurs prior to pharmacological inhibition or after genetic modification.

19. A composition comprising a T-cell selected from the group consisting of a TCR-engineered T-cell, a CAR-engineered T-cell, and a CAR-T cell, wherein the T-cell substantially lacks functional plexin A2 and/or functional plexin-A4.

* * * * *

```
SEQUENCE LISTING

<160> NUMBER OF SEQ ID NOS: 1

<210> SEQ ID NO 1
<211> LENGTH: 8
<212> TYPE: PRT
<213> ORGANISM: Artificial Sequence
<220> FEATURE:
<223> OTHER INFORMATION: cytosolic chicken ovalbumin (OVA) peptide

<400> SEQUENCE: 1

Ser Ile Ile Asn Phe Glu Lys Leu
1               5
```